US008475269B2

(12) United States Patent
Okada

(10) Patent No.: US 8,475,269 B2
(45) Date of Patent: Jul. 2, 2013

(54) GAMING MACHINE HAVING A FUNCTION OF CHANGING THE NUMBER OF FREE GAMES ACCORDING TO THE RESULT OF A ROLE PLAYING GAME

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 0 days.

(21) Appl. No.: 13/194,535

(22) Filed: Jul. 29, 2011

(65) Prior Publication Data

US 2011/0281632 A1 Nov. 17, 2011

Related U.S. Application Data

(63) Continuation of application No. 11/937,356, filed on Nov. 8, 2007.

(60) Provisional application No. 60/905,071, filed on Mar. 6, 2007.

(51) Int. Cl.
*A63F 13/10* (2006.01)
*G07F 17/32* (2006.01)

(52) U.S. Cl.
CPC ........ *G07F 17/3213* (2013.01); *G07F 17/3258* (2013.01); *G07F 17/3267* (2013.01); *A63F 2300/6036* (2013.01)
USPC ............................................... 463/29; 463/20

(58) Field of Classification Search
CPC .............. G07F 17/3213; G07F 17/3258; G07F 17/3267; A63F 2300/6036; A63F 13/10
USPC ........... 463/16, 20, 25, 26–29, 30, 31, 40–42, 463/11–13, 17–19, 43
See application file for complete search history.

(56) References Cited

U.S. PATENT DOCUMENTS

| | | | | |
|---|---|---|---|---|
| 4,685,677 | A | 8/1987 | Demar et al. | |
| 5,178,389 | A * | 1/1993 | Bentley et al. | 463/29 |
| 5,453,928 | A | 9/1995 | Kaminkow et al. | |
| 5,533,727 | A | 7/1996 | Demar | |
| 6,213,874 | B1 | 4/2001 | Heflin | |
| 6,443,452 | B1 * | 9/2002 | Brune | 273/143 R |
| 6,491,584 | B2 | 12/2002 | Graham et al. | |
| 2001/0036851 | A1 * | 11/2001 | Sasaki et al. | 463/1 |

(Continued)

FOREIGN PATENT DOCUMENTS

| | | | |
|---|---|---|---|
| AU | 200119729 | B2 | 9/2001 |
| AU | 200119729 | B2 * | 9/2001 |

*Primary Examiner* — David L Lewis
*Assistant Examiner* — Matthew D. Hoel
(74) *Attorney, Agent, or Firm* — Lexyoume IP Meister, PLLC.

(57) ABSTRACT

A controller is provided which includes: a function whereby a video image is randomly determined with respect to a mini game to be displayed on a display each time the mini game is executed; a function whereby the determined video image is extracted from memory and displayed on the display; a function whereby determination is randomly made as to whether the points associated with the displayed video image are to be added to the accumulated points; a function whereby, in a case that determination has been made that the points are to be added to the accumulated points, the points are added to the accumulated points, thereby updating the accumulated points; and a function whereby, after the mini game has been executed a predetermined number of times, the number of free games is determined according to the updated accumulated points.

15 Claims, 24 Drawing Sheets

U.S. PATENT DOCUMENTS

| | | | | |
|---|---|---|---|---|
| 2002/0010017 | A1* | 1/2002 | Bennett | 463/20 |
| 2002/0025846 | A1 | 2/2002 | Bennett et al. | |
| 2002/0025848 | A1 | 2/2002 | Graham et al. | |
| 2002/0025849 | A1 | 2/2002 | Olive | |
| 2002/0047238 | A1 | 4/2002 | Ainsworth et al. | |
| 2003/0069056 | A1* | 4/2003 | Cormack et al. | 463/16 |
| 2003/0119577 | A1* | 6/2003 | Motegi et al. | 463/20 |
| 2003/0162585 | A1* | 8/2003 | Bigelow et al. | 463/20 |
| 2003/0216184 | A1* | 11/2003 | Kigoshi | 463/42 |
| 2003/0228908 | A1* | 12/2003 | Caiafa et al. | 463/42 |
| 2004/0002369 | A1* | 1/2004 | Walker et al. | 463/1 |
| 2004/0048646 | A1* | 3/2004 | Visocnik | 463/16 |
| 2004/0087359 | A1* | 5/2004 | Cuddy et al. | 463/20 |
| 2005/0143166 | A1* | 6/2005 | Walker et al. | 463/25 |
| 2006/0183521 | A1* | 8/2006 | Hamamoto | 463/8 |
| 2006/0205509 | A1* | 9/2006 | Hirota | 463/40 |
| 2009/0156302 | A1* | 6/2009 | Narita et al. | 463/29 |

* cited by examiner

FIG. 7

SYMBOL DISPOSITION TABLE

| SYMBOL POSITION | SYMBOL | | | | |
|---|---|---|---|---|---|
| | FIRST REEL | SECOND REEL | THIRD REEL | FOURTH REEL | FIFTH REEL |
| 20 | BONUS | BONUS | BONUS | BONUS | BONUS |
| 19 | A | MASK | Q | A | 10 |
| 18 | HOLY CUP | K | K | TREASURE | SNAKE |
| 17 | TREASURE | COMPASS | 10 | Q | HOLY CUP |
| 16 | Q | MASK | K | K | J |
| 15 | 10 | Q | TREASURE | MASK | TREASURE |
| 14 | TREASURE | HOLY CUP | HOLY CUP | BONUS | WILD |
| 13 | WILD | J | J | Q | Q |
| 12 | J | BONUS | BONUS | SNAKE | HOLY CUP |
| 11 | MASK | HOLY CUP | TREASURE | 10 | A |
| 10 | J | A | WILD | WILD | WILD |
| 9 | HOLY CUP | Q | COMPASS | 10 | A |
| 8 | TREASURE | WILD | A | BONUS | 10 |
| 7 | A | A | 10 | Q | TREASURE |
| 6 | HOLY CUP | J | J | COMPASS | MASK |
| 5 | TREASURE | K | HOLY CUP | Q | 10 |
| 4 | A | TREASURE | TREASURE | K | TREASURE |
| 3 | Q | A | WILD | Q | K |
| 2 | COMPASS | HOLY CUP | TREASURE | HOLY CUP | COMPASS |
| 1 | 10 | TREASURE | K | A | TREASURE |
| 0 | K | Q | TREASURE | Q | MASK |

FIG. 11

BASIC GAME RANDOM NUMBER TABLE
(RANDOM NUMBER EXTRACTION RANGE : 0~65535)

| SYMBOL | RANDOM NUMBER RANGE | DETERMINATION PROBABILITY |
|---|---|---|
| BONUS | 0 ~ 299 | 300 / 65536 |
| WILD | 300 ~ 300 | 1 / 65536 |
| SNAKE | 301 ~ 350 | 50 / 65536 |
| TREASURE BOX | 351 ~ 400 | 50 / 65536 |
| GOLDEN MASK | 401 ~ 450 | 50 / 65536 |
| HOLY CUP | 451 ~ 500 | 50 / 65536 |
| COMPASS&MAP | 501 ~ 550 | 50 / 65536 |
| A | 551 ~ 1550 | 1000 / 65536 |
| K | 1551 ~ 2550 | 1000 / 65536 |
| Q | 2551 ~ 3550 | 1000 / 65536 |
| J | 3551 ~ 4550 | 1000 / 65536 |
| 10 | 4551 ~ 9999 | 5449 / 65536 |
| BLANK | 10000 ~ 65535 | 55536 / 65536 |

FIG. 12

VIDEO IMAGE TYPE DETERMINATION RANDOM NUMBER TABLE
(RANDOM NUMBER RANGE : 0~65535)

| VIDEO IMAGE TYPE | RANDOM NUMBER RANGE | DETERMINATION PROBABILITY |
|---|---|---|
| FIRST ENEMY CHARACTER | 0 ~ 29999 | 30000 / 65536 |
| SECOND ENEMY CHARACTER | 30000 ~ 49999 | 20000 / 65536 |
| THIRD ENEMY CHARACTER | 50000 ~ 65535 | 15536 / 65536 |

FIG. 13

POINTS TABLE

| VIDEO IMAGE TYPE | POINTS |
|---|---|
| FIRST ENEMY | 10 |
| SECOND ENEMY | 20 |
| THIRD ENEMY | 30 |

FIG. 14

POINTS ADDITION DETERMINATION RANDOM NUMBER TABLE 1
(EXPERIENCE VALUE0～50、RANDOM NUMBER RANGE : 0～65535)
(EXPERIENCE VALUE = NUMBER OF INSTANCES OF EXECUTION OF MINI GAME + ACCUMULATED POINTS)

| RESULT | RANDOM NUMBER RANGE | DETERMINATION PROBABILITY |
|---|---|---|
| WIN VICTORY OVER FIRST ENEMY | 0 ～ 9999 | 10000 ／ 65536 |
| WIN VICTORY OVER SECOND ENEMY | 10000 ～ 16999 | 7000 ／ 65536 |
| WIN VICTORY OVER THIRD ENEMY | 17000 ～ 19999 | 3000 ／ 65536 |
| LOSE | 20000 ～ 65535 | 45536 ／ 65536 |

FIG. 15

POINTS ADDITION DETERMINATION RANDOM NUMBER TABLE 2
(EXPERIENCE VALUE51～100、RANDOM NUMBER RANGE : 0～65535)
(EXPERIENCE VALUE = NUMBER OF INSTANCES OF EXECUTION OF MINI GAME + ACCUMULATED POINTS)

| RESULT | RANDOM NUMBER RANGE | DETERMINATION PROBABILITY |
|---|---|---|
| WIN VICTORY OVER FIRST ENEMY | 0 ～ 19999 | 20000 ／ 65536 |
| WIN VICTORY OVER SECOND ENEMY | 20000 ～ 33999 | 14000 ／ 65536 |
| WIN VICTORY OVER THIRD ENEMY | 34000 ～ 39999 | 6000 ／ 65536 |
| LOSE | 40000 ～ 65535 | 25536 ／ 65536 |

FIG. 16

POINTS ADDITION DETERMINATION RANDOM NUMBER TABLE 3
(EXPERIENCE VALUE 101 OR MORE、RANDOM NUMBER RANGE : 0～65535)
(EXPERIENCE VALUE = NUMBER OF INSTANCES OF EXECUTION OF MINI GAME + ACCUMULATED POINTS)

| RESULT | RANDOM NUMBER RANGE | DETERMINATION PROBABILITY |
|---|---|---|
| WIN VICTORY OVER FIRST ENEMY | 0 ～ 29999 | 30000 ／ 65536 |
| WIN VICTORY OVER SECOND ENEMY | 30000 ～ 50999 | 21000 ／ 65536 |
| WIN VICTORY OVER THIRD ENEMY | 51000 ～ 59999 | 9000 ／ 65536 |
| LOSE | 60000 ～ 65535 | 5536 ／ 65536 |

FIG. 17

FREE GAMES TABLE

| ACCUMULATED POINTS | NUMBER OF FREE GAMES |
|---|---|
| 0～20 | 50 |
| 21～50 | 80 |
| 50～100 | 100 |
| 101 OR MORE | 150 |

(MINI GAME PROCESSING 2)

FIG. 25

FREE GAME RANDOM NUMBER TABLE
(RANDOM NUMBER EXTRACTION RANGE : 0～65535)

| SYMBOL | RANDOM NUMBER RANGE | DETERMINATION PROBABILITY |
|---|---|---|
| BONUS | 0 ～ 999 | 1000 ／ 65536 |
| WILD | 1000 ～ 1009 | 10 ／ 65536 |
| SNAKE | 1010 ～ 1499 | 490 ／ 65536 |
| TREASURE BOX | 1500 ～ 1899 | 400 ／ 65536 |
| GOLDEN MASK | 1900 ～ 2299 | 400 ／ 65536 |
| HOLY CUP | 2300 ～ 2699 | 400 ／ 65536 |
| COMPASS&MAP | 2700 ～ 3099 | 400 ／ 65536 |
| A | 3100 ～ 3899 | 800 ／ 65536 |
| K | 3900 ～ 4699 | 800 ／ 65536 |
| Q | 4700 ～ 5499 | 800 ／ 65536 |
| J | 5500 ～ 6299 | 800 ／ 65536 |
| 10 | 6300 ～ 10099 | 3800 ／ 65536 |
| BLANK | 10100 ～ 65535 | 55436 ／ 65536 |

FIG. 26

EXTRA FREE GAMES TABLE

| ACCUMULATED POINTS | NUMBER OF EXTRA FREE GAMES |
|---|---|
| 0～20 | 10 |
| 21～50 | 30 |
| 50～100 | 50 |
| 101 OR MORE | 70 |

FIG. 27
30
PAID
BET
1 ¢
CREDIT
NUMBER OF MINI GAMES
15
ACCUMULATED POINTS
200
80
YOU WIN 70 EXTRA FREE GAMES!!

GAMING MACHINE HAVING A FUNCTION OF CHANGING THE NUMBER OF FREE GAMES ACCORDING TO THE RESULT OF A ROLE PLAYING GAME

CROSS-REFERENCE TO RELATED APPLICATIONS

This application is a continuation application of U.S. application Ser. No. 11/937,356, filed on Nov. 8, 2007, which claims the benefit of U.S. Provisional Application Ser. No. 60/850,675, filed Oct. 11, 2006 and entitled "Toner Container and Image Forming Device", each of which is incorporated herein by reference.

BACKGROUND OF THE INVENTION

1. Field of the Invention

The present invention relates to a gaming machine having a function of changing the number of free games based upon the results of a role playing game (RPG).

2. Related Art

It is known that a type of conventional slot machine has a function whereby, in a case that a predetermined condition has been satisfied in a basic game, the game mode is switched to a free game mode which allows the player to play a game without spending any credits. In a case that the slot machine has entered the free game mode, the player has a chance to win a great amount of credit. For example, AU2000PQ6296 discloses a free game employed as a second game. In general, the number of such free games is randomly determined, or is set to a predetermined fixed number.

The present invention provides a gaming machine that offers a novel form of entertainment.

SUMMARY OF THE INVENTION

A first aspect of the present invention relates to a gaming machine having the following configuration. The gaming machine includes: a display which displays a video image; memory which stores accumulated points that are updated according to the results of executing a mini game, and multiple video images with respect to the mini game; an input device which outputs a signal that starts a basic game; and a controller which provides: (a) a function whereby, upon receipt of the signal from the input device, the basic game is started; (b) a function whereby, in a case that the basic game has started, the mini game is executed; (c) a function whereby a video image is randomly determined with respect to the mini game to be displayed on the display each time the mini game is executed; (d) a function whereby the determined video image is extracted from the memory and displayed on the display; (e) a function whereby determination is randomly made as to whether the points associated with the displayed video image are to be added to the accumulated points; (f) a function whereby, in a case that determination has been made that the points are to be added to the accumulated points, the points are added to the accumulated points, thereby updating the accumulated points; and (g) a function whereby, after the mini game has been executed a predetermined number of times, the number of free games is determined according to the updated accumulated points.

The gaming machine according to the first aspect of the present invention provides: (a) a function whereby, upon receipt of the signal from the input device, the basic game is started; (b) a function whereby, in a case that the basic game has started, the mini game is executed; (c) a function whereby a video image is randomly determined with respect to the mini game to be displayed on the display each time the mini game is executed; (d) a function whereby the determined video image is extracted from the memory and displayed on the display; (e) a function whereby determination is randomly made as to whether the points associated with the displayed video image are to be added to the accumulated points; (f) a function whereby, in a case that determination has been made that the points are to be added to the accumulated points, the points are added to the accumulated points, thereby updating the accumulated points; and (g) a function whereby, after the mini game has been executed a predetermined number of times, the number of free games is determined according to the updated accumulated points.

A second aspect of the present invention relates to a gaming machine having the following configuration. The gaming machine includes: a display which displays a video image; memory which stores accumulated points that are updated according to the results of executing a mini game, and multiple video images with respect to the mini game; an input device which outputs a signal that starts a basic game; and a controller which provides: (a) a function whereby, upon receipt of the signal from the input device, the basic game is started; (b) a function whereby, in a case that the basic game has started, the mini game is executed; (c) a function whereby a video image is randomly determined with respect to the mini game to be displayed on the display each time the mini game is executed; (d) a function whereby the determined video image is extracted from the memory and displayed on the display; (e) a function whereby determination is made according to the accumulated points stored in the memory as to whether the points associated with the displayed video image are to be added to the accumulated points; (f) a function whereby, in a case that determination has been made that the points are to be added to the accumulated points, the points are added to the accumulated points, thereby updating the accumulated points; and (g) a function whereby, after the mini game has been executed a predetermined number of times, the number of free games is determined according to the updated accumulated points.

The gaming machine according to the second aspect of the present invention provides: (a) a function whereby, upon receipt of the signal from the input device, the basic game is started; (b) a function whereby, in a case that the basic game has started, the mini game is executed; (c) a function whereby a video image is randomly determined with respect to the mini game to be displayed on the display each time the mini game is executed; (d) a function whereby the determined video image is extracted from the memory and displayed on the display; (e) a function whereby determination is made according to the accumulated points stored in the memory as to whether the points associated with the displayed video image are to be added to the accumulated points; (f) a function whereby, in a case that determination has been made that the points are to be added to the accumulated points, the points are added to the accumulated points, thereby updating the accumulated points; and (g) a function whereby, after the mini game has been executed a predetermined number of times, the number of free games is determined according to the updated accumulated points.

A third aspect of the present invention relates to a gaming machine having the following configuration. The gaming machine includes: a display which displays a video image; memory which stores accumulated points that are updated according to the results of executing a mini game, and multiple video images with respect to the mini game; an input device which outputs a signal that starts a basic game; and a controller which provides: (a) a function whereby, upon receipt of the signal from the input device, the basic game is started; (b) a function whereby, in a case that the basic game has started, the mini game is executed; (c) a function whereby a video image is randomly determined with respect to the mini game to be displayed on the display each time the mini game is executed; (d) a function whereby the determined video image is extracted from the memory and displayed on the display; (e) a function whereby determination is made according to the accumulated number of times the mini game has been executed as to whether the points associated with the displayed video image are to be added to the accumulated points; (f) a function whereby, in a case that determination has been made that the points are to be added to the accumulated points, the points are added to the accumulated points, thereby updating the accumulated points; and (g) a function whereby, after the mini game has been executed a predetermined number of times, the number of free games is determined according to the updated accumulated points.

The gaming machine according to the third aspect of the present invention provides: (a) a function whereby, upon receipt of the signal from the input device, the basic game is started; (b) a function whereby, in a case that the basic game has started, the mini game is executed; (c) a function whereby a video image is randomly determined with respect to the mini game to be displayed on the display each time the mini game is executed; (d) a function whereby the determined video image is extracted from the memory and displayed on the display; (e) a function whereby determination is made according to the accumulated number of times the mini game has been executed as to whether the points associated with the displayed video image are to be added to the accumulated points; (f) a function whereby, in a case that determination has been made that the points are to be added to the accumulated points, the points are added to the accumulated points, thereby updating the accumulated points; and (g) a function whereby, after the mini game has been executed a predetermined number of times, the number of free games is determined according to the updated accumulated points.

A fourth aspect of the present invention relates to a gaming machine having the following configuration. The gaming machine includes: a display which displays a video image; memory which stores accumulated points that are updated according to the results of executing a mini game, and multiple video images with respect to the mini game; an input device which outputs a signal that starts a basic game; and a controller which provides: (a) a function whereby, upon receipt of the signal from the input device, the basic game is started; (b) a function whereby, in a case that the basic game has started, the mini game is executed; (c) a function whereby a video image is randomly determined with respect to the mini game to be displayed on the display each time the mini game is executed; (d) a function whereby the determined video image is extracted from the memory and displayed on the display; (e) a function whereby determination is made according to both the accumulated points and the accumulated number of times the mini game has been executed, that are stored in the memory, as to whether the points associated with the displayed video image are to be added to the accumulated points; (f) a function whereby, in a case that determination has been made that the points are to be added to the accumulated points, the points are added to the accumulated points, thereby updating the accumulated points; and (g) a function whereby, after the mini game has been executed a predetermined number of times, the number of free games is determined according to the updated accumulated points.

The gaming machine according to the fourth aspect of the present invention provides: (a) a function whereby, upon receipt of the signal from the input device, the basic game is started; (b) a function whereby, in a case that the basic game has started, the mini game is executed; (c) a function whereby a video image is randomly determined with respect to the mini game to be displayed on the display each time the mini game is executed; (d) a function whereby the determined video image is extracted from the memory and displayed on the display; (e) a function whereby determination is made according to both the accumulated points and the accumulated number of times the mini game has been executed, that are stored in the memory, as to whether the points associated with the displayed video image are to be added to the accumulated points; (f) a function whereby, in a case that determination has been made that the points are to be added to the accumulated points, the points are added to the accumulated points, thereby updating the accumulated points; and (g) a function whereby, after the mini game has been executed a predetermined number of times, the number of free games is determined according to the updated accumulated points.

A fifth aspect of the present invention relates to a gaming machine having the following configuration. The gaming machine includes: a display which displays a video image; memory which stores accumulated points that are updated according to the results of executing a mini game, and multiple video images with respect to the mini game; an input device which outputs a signal that starts a basic game; and a controller which provides: (a) a function whereby, upon receipt of the signal from the input device, the basic game is started; (b) a function whereby, in a case that the basic game has started, the mini game is executed; (c) a function whereby a video image is randomly determined with respect to the mini game to be displayed on the display each time the mini game is executed; (d) a function whereby the determined video image is extracted from the memory and displayed on the display; (e) a function whereby determination is randomly made as to whether the points associated with the displayed video image are to be added to the accumulated points; (f) a function whereby, in a case that determination has been made that the points are to be added to the accumulated points, the points are added to the accumulated points, thereby updating the accumulated points; (g) a function whereby, after the mini game has been executed a predetermined number of times, the number of free games is determined according to the updated accumulated points; and (h) a function whereby, in a case that a predetermined condition has been satisfied, the basic game mode is switched to the free game mode, and the free game is executed the determined number of times.

The gaming machine according to the fifth aspect of the present invention provides: (a) a function whereby, upon receipt of the signal from the input device, the basic game is started; (b) a function whereby, in a case that the basic game has started, the mini game is executed; (c) a function whereby a video image is randomly determined with respect to the mini game to be displayed on the display each time the mini game is executed; (d) a function whereby the determined video image is extracted from the memory and displayed on the display; (e) a function whereby determination is randomly made as to whether the points associated with the displayed video image are to be added to the accumulated points; (f) a function whereby, in a case that determination has been made that the points are to be added to the accumulated points, the points are added to the accumulated points, thereby updating the accumulated points; (g) a function whereby, after the mini game has been executed a predetermined number of times, the number of free games is determined according to the updated accumulated points; and (h) a function whereby, in a case that a predetermined condition has been satisfied, the basic game mode is switched to the free game mode, and the free game is executed the determined number of times.

A sixth aspect of the present invention relates to a gaming machine having the following configuration. The gaming machine includes: a display which displays a video image; memory which stores accumulated points that are updated according to the results of executing a mini game, and multiple video images with respect to the mini game; an input device which outputs a signal that starts a basic game; and a controller which provides: (a) a function whereby, upon receipt of the signal from the input device, the basic game is started; (b) a function whereby, in a case that the basic game has started, the mini game is executed; (c) a function whereby a video image is randomly determined with respect to the mini game to be displayed on the display each time the mini game is executed; (d) a function whereby the determined video image is extracted from the memory and displayed on the display; (e) a function whereby determination is made according to the accumulated points stored in the memory as to whether the points associated with the displayed video image are to be added to the accumulated points; (f) a function whereby, in a case that determination has been made that the points are to be added to the accumulated points, the points are added to the accumulated points, thereby updating the accumulated points; (g) a function whereby, after the mini game has been executed a predetermined number of times, the number of free games is determined according to the updated accumulated points; and (h) a function whereby, in a case that a predetermined condition has been satisfied, the basic game mode is switched to the free game mode, and the free game is executed the determined number of times.

The gaming machine according to the sixth aspect of the present invention provides: (a) a function whereby, upon receipt of the signal from the input device, the basic game is started; (b) a function whereby, in a case that the basic game has started, the mini game is executed; (c) a function whereby a video image is randomly determined with respect to the mini game to be displayed on the display each time the mini game is executed; (d) a function whereby the determined video image is extracted from the memory and displayed on the display; (e) a function whereby determination is made according to the accumulated points stored in the memory as to whether the points associated with the displayed video image are to be added to the accumulated points; (f) a function whereby, in a case that determination has been made that the points are to be added to the accumulated points, the points are added to the accumulated points, thereby updating the accumulated points; (g) a function whereby, after the mini game has been executed a predetermined number of times, the number of free games is determined according to the updated accumulated points; and (h) a function whereby, in a case that a predetermined condition has been satisfied, the basic game mode is switched to the free game mode, and the free game is executed the determined number of times.

A seventh aspect of the present invention relates to a gaming machine having the following configuration. The gaming machine includes: a display which displays a video image; memory which stores accumulated points that are updated according to the results of executing a mini game, and multiple video images with respect to the mini game; an input device which outputs a signal that starts a basic game; and a controller which provides: (a) a function whereby, upon receipt of the signal from the input device, the basic game is started; (b) a function whereby, in a case that the basic game has started, the mini game is executed; (c) a function whereby a video image is randomly determined with respect to the mini game to be displayed on the display each time the mini game is executed; (d) a function whereby the determined video image is extracted from the memory and displayed on the display; (e) a function whereby determination is made according to the accumulated number of times the mini game has been executed as to whether the points associated with the displayed video image are to be added to the accumulated points; (f) a function whereby, in a case that determination has been made that the points are to be added to the accumulated points, the points are added to the accumulated points, thereby updating the accumulated points; (g) a function whereby, after the mini game has been executed a predetermined number of times, the number of free games is determined according to the updated accumulated points; and (h) a function whereby, in a case that a predetermined condition has been satisfied, the basic game mode is switched to the free game mode, and the free game is executed the determined number of times.

The gaming machine according to the seventh aspect of the present invention provides: (a) a function whereby, upon receipt of the signal from the input device, the basic game is started; (b) a function whereby, in a case that the basic game has started, the mini game is executed; (c) a function whereby a video image is randomly determined with respect to the mini game to be displayed on the display each time the mini game is executed; (d) a function whereby the determined video image is extracted from the memory and displayed on the display; (e) a function whereby determination is made according to the accumulated number of times the mini game has been executed as to whether the points associated with the displayed video image are to be added to the accumulated points; (f) a function whereby, in a case that determination has been made that the points are to be added to the accumulated points, the points are added to the accumulated points, thereby updating the accumulated points; (g) a function whereby, after the mini game has been executed a predetermined number of times, the number of free games is determined according to the updated accumulated points; and (h) a function whereby, in a case that a predetermined condition has been satisfied, the basic game mode is switched to the free game mode, and the free game is executed the determined number of times.

An eighth aspect of the present invention relates to a gaming machine having the following configuration. The gaming machine includes: a display which displays a video image; memory which stores accumulated points that are updated according to the results of executing a mini game, and multiple video images with respect to the mini game; an input device which outputs a signal that starts a basic game; and a controller which provides: (a) a function whereby, upon receipt of the signal from the input device, the basic game is started; (b) a function whereby, in a case that the basic game has started, the mini game is executed; (c) a function whereby a video image is randomly determined with respect to the mini game to be displayed on the display each time the mini game is executed; (d) a function whereby the determined video image is extracted from the memory and displayed on the display; (e) a function whereby determination is made according to both the accumulated points and the accumulated number of times the mini game has been executed, that are stored in the memory, as to whether the points associated with the displayed video image are to be added to the accumulated points; (f) a function whereby, in a case that determination has been made that the points are to be added to the accumulated points, the points are added to the accumulated points, thereby updating the accumulated points; (g) a function whereby, after the mini game has been executed a predetermined number of times, the number of free games is determined according to the updated accumulated points; and (h) a function whereby, in a case that a predetermined condition has been satisfied, the basic game mode is switched to the free game mode, and the free game is executed the determined number of times.

The gaming machine according to the eighth aspect of the present invention provides: (a) a function whereby, upon receipt of the signal from the input device, the basic game is started; (b) a function whereby, in a case that the basic game has started, the mini game is executed; (c) a function whereby a video image is randomly determined with respect to the mini game to be displayed on the display each time the mini game is executed; (d) a function whereby the determined video image is extracted from the memory and displayed on the display; (e) a function whereby determination is made according to both the accumulated points and the accumulated number of times the mini game has been executed, that are stored in the memory, as to whether the points associated with the displayed video image are to be added to the accumulated points; (f) a function whereby, in a case that determination has been made that the points are to be added to the accumulated points, the points are added to the accumulated points, thereby updating the accumulated points; (g) a function whereby, after the mini game has been executed a predetermined number of times, the number of free games is determined according to the updated accumulated points; and (h) a function whereby, in a case that a predetermined condition has been satisfied, the basic game mode is switched to the free game mode, and the free game is executed the determined number of times.

A ninth aspect of the present invention relates to a gaming machine having the following configuration. The gaming machine includes: a display which displays a video image; memory which stores accumulated points that are updated according to the results of executing a mini game, and multiple video images with respect to the mini game; an input device which outputs a signal that starts a basic game; and a controller which provides: (a) a function whereby, upon receipt of the signal from the input device, the basic game is started; (b) a function whereby, in a case that a predetermined condition has been satisfied, the basic game mode is switched to the free game mode; (c) a function whereby, in a case that the game mode has been switched to the free game mode, the mini game is executed; (d) a function whereby a video image is randomly determined with respect to the mini game to be displayed on the display each time the mini game is executed; (e) a function whereby the determined video image is extracted from the memory and displayed on the display; (f) a function whereby determination is randomly made as to whether the points associated with the displayed video image are to be added to the accumulated points; (g) a function whereby, in a case that determination has been made that the points are to be added to the accumulated points, the points are added to the accumulated points, thereby updating the accumulated points; (h) a function whereby, after the mini game has been executed a predetermined number of times, the number of extra free games is determined according to the updated accumulated points; and (i) a function whereby the extra free game is executed the determined number of times.

The gaming machine according to the ninth aspect of the present invention provides: (a) a function whereby, upon receipt of the signal from the input device, the basic game is started; (b) a function whereby, in a case that a predetermined condition has been satisfied, the basic game mode is switched to the free game mode; (c) a function whereby, in a case that the game mode has been switched to the free game mode, the mini game is executed; (d) a function whereby a video image is randomly determined with respect to the mini game to be displayed on the display each time the mini game is executed; (e) a function whereby the determined video image is extracted from the memory and displayed on the display; (f) a function whereby determination is randomly made as to whether the points associated with the displayed video image are to be added to the accumulated points; (g) a function whereby, in a case that determination has been made that the points are to be added to the accumulated points, the points are added to the accumulated points, thereby updating the accumulated points; (h) a function whereby, after the mini game has been executed a predetermined number of times, the number of extra free games is determined according to the updated accumulated points; and (i) a function whereby the extra free game is executed the determined number of times.

A tenth aspect of the present invention relates to a gaming machine having the following configuration. The gaming machine includes: a display which displays a video image; memory which stores accumulated points that are updated according to the results of executing a mini game, and multiple video images with respect to the mini game; an input device which outputs a signal that starts a basic game; and a controller which provides: (a) a function whereby, upon receipt of the signal from the input device, the basic game is started; (b) a function whereby, in a case that a predetermined condition has been satisfied, the basic game mode is switched to the free game mode; (c) a function whereby, in a case that the game mode has been switched to the free game mode, the mini game is executed; (d) a function whereby a video image is randomly determined with respect to the mini game to be displayed on the display each time the mini game is executed; (e) a function whereby the determined video image is extracted from the memory and displayed on the display; (f) a function whereby determination is made according to the accumulated points stored in the memory as to whether the points associated with the displayed video image are to be added to the accumulated points; (g) a function whereby, in a case that determination has been made that the points are to be added to the accumulated points, the points are added to the accumulated points, thereby updating the accumulated points; (h) a function whereby, after the mini game has been executed a predetermined number of times, the number of extra free games is determined according to the updated accumulated points; and (i) a function whereby the extra free game is executed the determined number of times.

The gaming machine according to the tenth aspect of the present invention provides: (a) a function whereby, upon receipt of the signal from the input device, the basic game is started; (b) a function whereby, in a case that a predetermined condition has been satisfied, the basic game mode is switched to the free game mode; (c) a function whereby, in a case that the game mode has been switched to the free game mode, the mini game is executed; (d) a function whereby a video image is randomly determined with respect to the mini game to be displayed on the display each time the mini game is executed; (e) a function whereby the determined video image is extracted from the memory and displayed on the display; (f) a function whereby determination is made according to the accumulated points stored in the memory as to whether the points associated with the displayed video image are to be added to the accumulated points; (g) a function whereby, in a case that determination has been made that the points are to be added to the accumulated points, the points are added to the accumulated points, thereby updating the accumulated points; (h) a function whereby, after the mini game has been executed a predetermined number of times, the number of extra free games is determined according to the updated accumulated points; and (i) a function whereby the extra free game is executed the determined number of times.

An eleventh aspect of the present invention relates to a gaming machine having the following configuration. The gaming machine includes: a display which displays a video image; memory which stores accumulated points that are updated according to the results of executing a mini game, and multiple video images with respect to the mini game; an input device which outputs a signal that starts a basic game; and a controller which provides: (a) a function whereby, upon receipt of the signal from the input device, the basic game is started; (b) a function whereby, in a case that a predetermined condition has been satisfied, the basic game mode is switched to the free game mode; (c) a function whereby, in a case that the game mode has been switched to the free game mode, the mini game is executed; (d) a function whereby a video image is randomly determined with respect to the mini game to be displayed on the display each time the mini game is executed; (e) a function whereby the determined video image is extracted from the memory and displayed on the display; (f) a function whereby determination is made according to the accumulated number of times the mini game has been executed as to whether the points associated with the displayed video image are to be added to the accumulated points; (g) a function whereby, in a case that determination has been made that the points are to be added to the accumulated points, the points are added to the accumulated points, thereby updating the accumulated points; (h) a function whereby, after the mini game has been executed a predetermined number of times, the number of extra free games is determined according to the updated accumulated points; and (i) a function whereby the extra free game is executed the determined number of times.

The gaming machine according to the eleventh aspect of the present invention provides: (a) a function whereby, upon receipt of the signal from the input device, the basic game is started; (b) a function whereby, in a case that a predetermined condition has been satisfied, the basic game mode is switched to the free game mode; (c) a function whereby, in a case that the game mode has been switched to the free game mode, the mini game is executed; (d) a function whereby a video image is randomly determined with respect to the mini game to be displayed on the display each time the mini game is executed; (e) a function whereby the determined video image is extracted from the memory and displayed on the display; (f) a function whereby determination is made according to the accumulated number of times the mini game has been executed as to whether the points associated with the displayed video image are to be added to the accumulated points; (g) a function whereby, in a case that determination has been made that the points are to be added to the accumulated points, the points are added to the accumulated points, thereby updating the accumulated points; (h) a function whereby, after the mini game has been executed a predetermined number of times, the number of extra free games is determined according to the updated accumulated points; and (i) a function whereby the extra free game is executed the determined number of times.

A twelfth aspect of the present invention relates to a gaming machine having the following configuration. The gaming machine includes: a display which displays a video image; memory which stores accumulated points that are updated according to the results of executing a mini game, and multiple video images with respect to the mini game; an input device which outputs a signal that starts a basic game; and a controller which provides: (a) a function whereby, upon receipt of the signal from the input device, the basic game is started; (b) a function whereby, in a case that a predetermined condition has been satisfied, the basic game mode is switched to the free game mode; (c) a function whereby, in a case that the game mode has been switched to the free game mode, the mini game is executed; (d) a function whereby a video image is randomly determined with respect to the mini game to be displayed on the display each time the mini game is executed; (e) a function whereby the determined video image is extracted from the memory and displayed on the display; (f) a function whereby determination is made according to both the accumulated points and the accumulated number of times the mini game has been executed, that are stored in the memory, as to whether the points associated with the displayed video image are to be added to the accumulated points; (g) a function whereby, in a case that determination has been made that the points are to be added to the accumulated points, the points are added to the accumulated points, thereby updating the accumulated points; (h) a function whereby, after the mini game has been executed a predetermined number of times, the number of extra free games is determined according to the updated accumulated points; and (i) a function whereby the extra free game is executed the determined number of times.

The gaming machine according to the twelfth aspect of the present invention provides: (a) a function whereby, upon receipt of the signal from the input device, the basic game is started; (b) a function whereby, in a case that a predetermined condition has been satisfied, the basic game mode is switched to the free game mode; (c) a function whereby, in a case that the game mode has been switched to the free game mode, the mini game is executed; (d) a function whereby a video image is randomly determined with respect to the mini game to be displayed on the display each time the mini game is executed; (e) a function whereby the determined video image is extracted from the memory and displayed on the display; (f) a function whereby determination is made according to both the accumulated points and the accumulated number of times the mini game has been executed, that are stored in the memory, as to whether the points associated with the displayed video image are to be added to the accumulated points; (g) a function whereby, in a case that determination has been made that the points are to be added to the accumulated points, the points are added to the accumulated points, thereby updating the accumulated points; (h) a function whereby, after the mini game has been executed a predetermined number of times, the number of extra free games is determined according to the updated accumulated points; and (i) a function whereby the extra free game is executed the determined number of times.

BRIEF DESCRIPTION OF THE DRAWINGS

FIG. 7 is a diagram which shows a symbol disposition table according to the embodiment of the present invention;

FIG. 11 is a diagram which shows a basic game random number table according to the embodiment of the present invention;

FIG. 12 is a diagram which shows a video image type determination random number table 1 according to the embodiment of the present invention;

FIG. 13 is a diagram which shows a points table according to the embodiment of the present invention;

FIG. 14 is a diagram which shows a points addition determination random number table 1 according to the embodiment of the present invention;

FIG. 15 is a diagram which shows a points addition determination random number table 2 according to the embodiment of the present invention;

FIG. 16 is a diagram which shows a points addition determination random number table 3 according to the embodiment of the present invention;

FIG. 17 is a diagram which shows a free games table according to the embodiment of the present invention;

FIG. 25 is a diagram which shows a free game random number table according to the embodiment of the present invention;

FIG. 26 is a diagram which shows an extra free games table according to the embodiment of the present invention.

DETAILED DESCRIPTION OF THE INVENTION

Description will be made regarding an embodiment according to the present embodiment with reference to the drawings.

A gaming machine 13 according to the present invention includes a liquid crystal display 30 which displays a video image, RAM 110 which stores the number of accumulated points which is to be updated based upon the results of executing a mini game, ROM 108 which stores multiple video images for the mini game, and a start switch 25 which outputs a signal that is an instruction to start a basic game. With such an arrangement, upon receipt of a start signal via an input device, the CPU 106 starts the basic game. Also, in a case that the basic game has started, the CPU 106 executes the mini game. Also, the CPU 106 randomly determines the video image which is to be displayed on the liquid crystal display 30 for the mini game. Also, the CPU 106 extracts the video image thus determined from the ROM 108, and displays the video image thus extracted on the liquid crystal display 30. Also, the CPU 106 determines whether or not the points associated with the video image thus displayed are to be added to the accumulated points. In a case that determination has been made that the points are to be added to the accumulated points, the CPU 106 adds the points to the accumulated points, thereby updating the accumulated points. Also, after the mini game has been executed a predetermined number of times, the CPU 106 determines the number of free games based upon the accumulated points thus updated.

Figure 1:
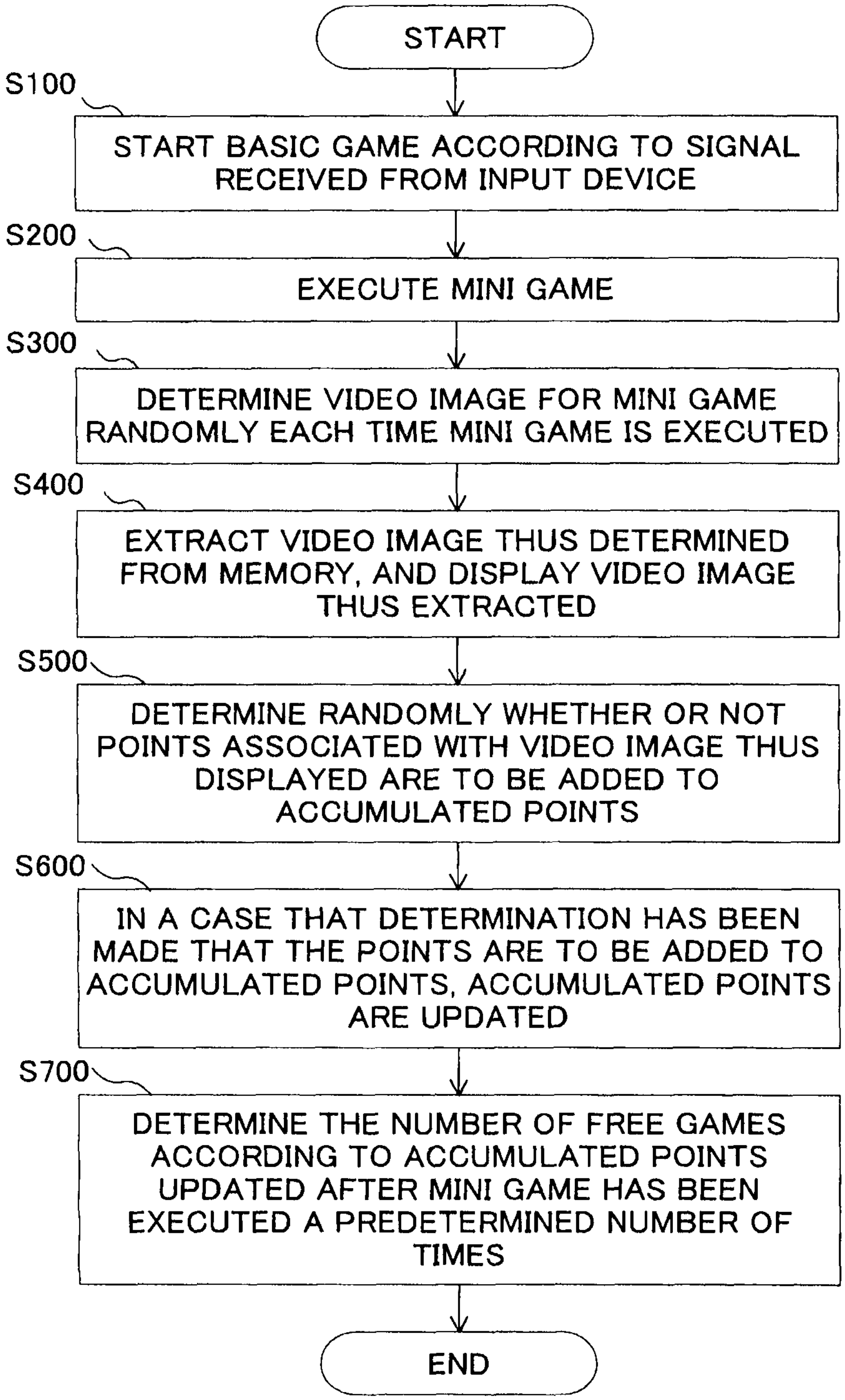
FIG. 1 is a flowchart which shows a flow of a game executed by a gaming machine according to an embodiment of the present invention.

Although detailed description of the particulars thereof will be made later, a summary description thereof will be made below. That is to say, as shown in FIG. 1, upon receipt of a signal via the input device, the CPU 106 starts a basic game (Step S100). In a case that the basic game has started, the CPU 106 executes a mini game (Step S200). Furthermore, every time that the CPU 106 executes the mini game, the CPU 106 randomly determines the video image which is to be displayed on the liquid crystal display 30 for the mini game (Step S300). Then, the CPU 106 extracts the video image thus determined from the ROM 108, and displays the video image thus extracted on the liquid crystal display 30 (Step S400). Furthermore, the CPU 106 randomly determines whether or not the points associated with the video image thus displayed are to be added to the accumulated points (Step S500). In a case that determination has been made that the addition of points is to be executed, the CPU 106 adds the points to the accumulated points, thereby updating the accumulated points (Step S600). After the mini game has been executed a predetermined number of times, the CPU 106 determines the number of free games based upon the accumulated points thus updated (Step S700).

Figure 2:
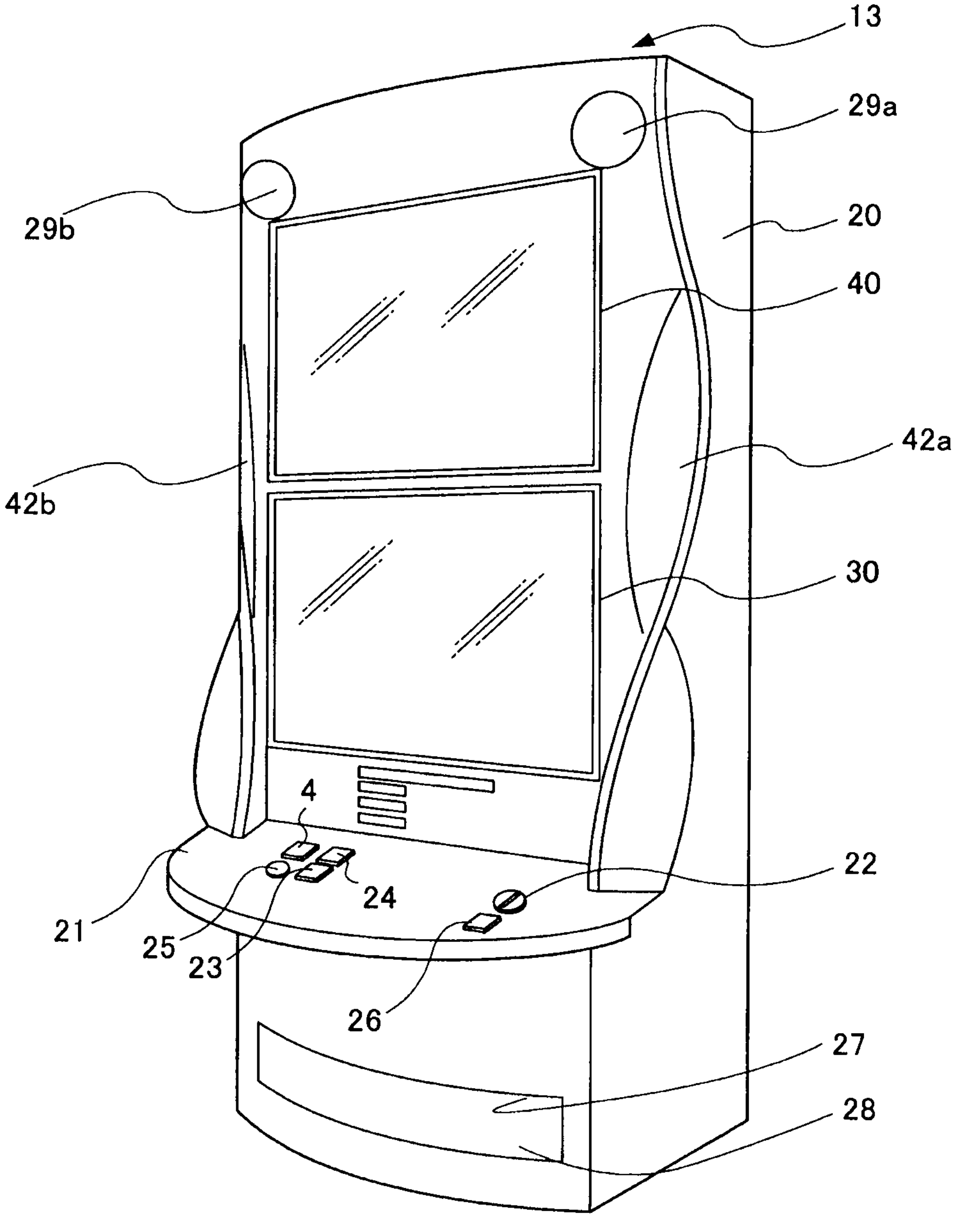
FIG. 2 is an external perspective view of the gaming machine according to the embodiment of the present invention.

FIG. 2 is a perspective view of the gaming machine 13 according to an embodiment of the present invention. The gaming machine 13 includes a cabinet 20. The cabinet 20 has a structure in which the face facing the player is open. The cabinet 20 includes various kinds of components. Such components include: a game controller 100 (see FIG. 4) for electrically controlling the gaming machine 13; a hopper 44 (FIG. 4) for controlling the insertion of coins (gaming medium) and for retaining and paying out the coins; etc. The gaming medium is not restricted to coins. Also, examples of such gaming media include medals, tokens, electronic money or electronic value information (credit) having the same value.

Furthermore, a liquid crystal display 30 is provided at approximately the central portion of the front face of the cabinet 20. Also, another liquid crystal display 40 is provided above the liquid crystal display 30.

The liquid crystal display 30 is provided as a display device for displaying various kinds of images with respect to the game such as images for providing visual effects. Such an arrangement allows the player to advance the game while observing various kinds of images displayed on the aforementioned liquid crystal display 30. During such a game, the liquid crystal display 30 displays images for the slot game and the mini game as shown in FIGS. 18 through 21, and FIG. 27.

The gaming machine 13 includes video reels. With such an arrangement, five virtual reels are displayed on the liquid crystal display 30. Note that the term "video reel" as used here represents a mechanism for displaying a reel on the liquid crystal display 30 in the form of an image, instead of a mechanical reel. Multiple kinds of symbols necessary for the basic game include "BONUS", "WILD", "TREASURE BOX", "GOLDEN MASK", "HOLY CUP", "COMPASS & MAP", "SNAKE", "A", "K", "Q", "J", and "10". With such an arrangement, the liquid crystal display 30 displays these symbols with an image as if the reel has rotated.

The other liquid crystal display 40 provided above the liquid crystal display 30 is provided for displaying sub-images. Examples of such sub-images include an image for describing the game rules, a demonstration image, etc.

Also, sound transmission openings 29*a* and 29*b* are provided on both the left and right sides above the liquid crystal display 40, which allow the sound effects generated by a speaker 41 (see FIG. 4) stored within the cabinet 20 to propagate outside the cabinet 20. The sound effects are generated from the sound transmission openings 29*a* and 29*b* according to the advance of the game. Also, decorative lamps 42*a* and 42*b* are provided on both the left and right sides of approximately the middle part of the gaming machine 13. The illumination of the gaming machine 13 by the decorative lamps 42*a* and 42*b* is controlled so as to correspond to the advance of the game.

The gaming machine 13 includes an approximately horizontal operation unit 21 below the liquid crystal display 30. Furthermore, a coin insertion opening 22, which allows the player to insert coins, is provided on the right side of the operation unit 21. On the other hand, the components provided to the left side of the operation unit 21 include: a BET switch 23 which allows the player to determine which lines are to be set to active pay lines among nine lines L1, L2, L3, L4, L5, L6, L7, L8, and L9, for providing a prize described later (which will simply be referred to as "active pay lines" hereafter), and which allows the player to select the number of coins as gaming media which are to be bet on the aforementioned active pay lines; and a spin repeat bet switch 24 which allows the player to play the game again without changing the number of coins bet on the aforementioned active pay lines from that in the immediately previous game. Such an arrangement allows the player to set the number of coins bet on the aforementioned active pay lines by performing a pushing operation on either the BET switch 23 or the spin repeat bet switch 24.

With the aforementioned operation unit 21, a start switch 25 is provided on the left side of the BET switch 23, which allows the player to input a start operation instruction for the basic game in increments of games. Upon performing a pushing operation on either the start switch 25 or the spin repeat bet switch 24, which serves as a trigger to start the game, the liquid crystal display 30 displays an image of the aforementioned five video reels 3A through 3E which then start to rotate.

On the other hand, a cash out switch 26 is provided near the coin insertion opening 22 on the aforementioned operation unit 21. Upon the player pushing the cash out switch 26, the inserted coins are paid out from a coin payout opening 27 provided at a lower portion of the front face of the cabinet 20. The coins thus paid out are retained in a coin tray 28.

Figure 3:
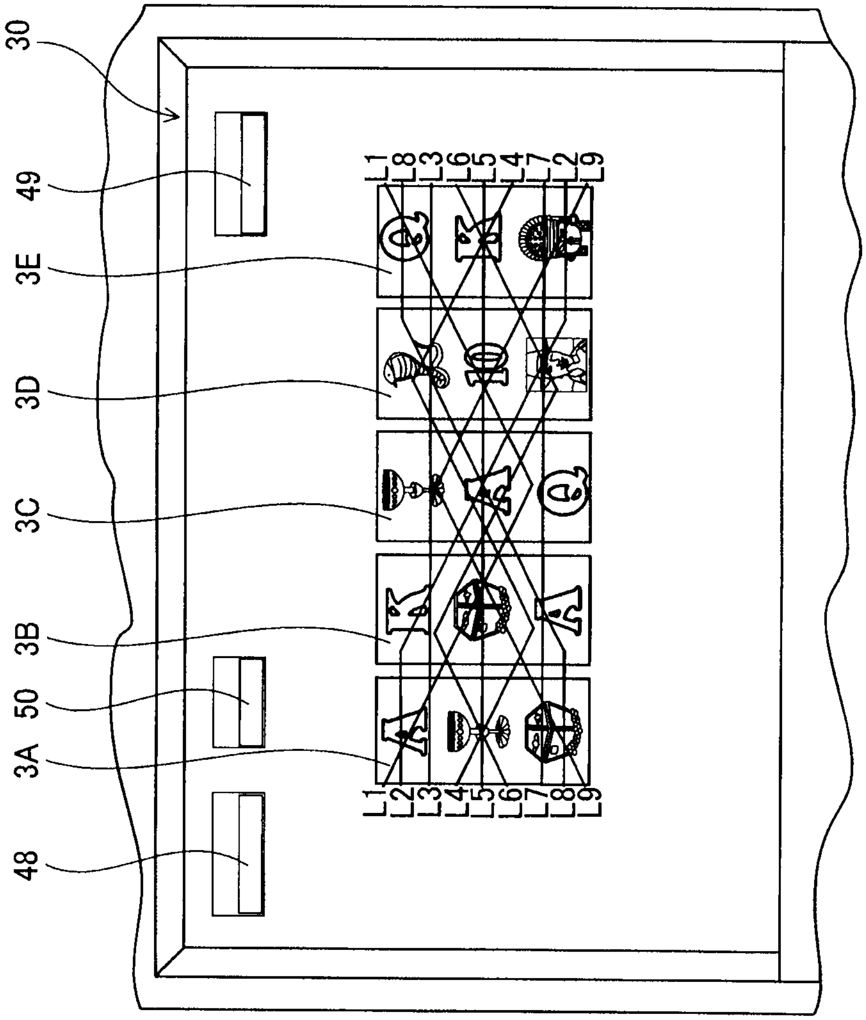
FIG. 3 is an enlarged front view which shows an enlargement of a display region of the gaming machine according to the embodiment of the present invention.

FIG. 3 is an enlarged view which shows the display region of the gaming machine 13. The gaming machine 13 has the nine lines L1 through L9 for providing nine kinds of prizes as shown in FIG. 3. Each of the lines L1 through L9 for providing a corresponding prize is formed such that it extends so as to pass through one of the symbols on each of the video reels 3A through 3E when the rotation of the five video reels 3A through 3E has stopped in the video image.

Upon pushing the aforementioned BET switch 23 once, the line L3 for providing a third prize, the line L5 for providing a fifth prize, and the line L7 for providing a seventh prize, are set to be active pay lines, and one coin is input as a credit medal, for example.

On the other hand, upon pushing the aforementioned BET switch 23 twice, the line L1 for providing a first prize, the line L4 for providing a fourth prize, and the line L8 for providing an eighth prize, are set to be active pay lines, in addition to the aforementioned three lines, and two coins are input as credit medals, for example.

On the other hand, upon pushing the aforementioned BET switch 23 three times, the line L2 for providing a second prize, the line L6 for providing a sixth prize, and the line L9 for providing a ninth prize, are set to be active pay lines, in addition to the aforementioned six lines, and three coins are input as credit medals, for example.

The game available in the present embodiment is a game in which a predetermined set of symbols are made along the active pay lines.

Furthermore, the liquid crystal display 30 displays, on the upper portion thereof, a payout display unit 48, a BET amount display unit 50, and a credit amount display unit 49 in that order from the left side. The payout display unit 48 is a component for displaying the amount of coins paid out when a particular winning combination of the symbols has been displayed along any one the active pay lines for providing a prize. The credit amount display unit 49 is a component for displaying the amount of coins retained in the gaming machine 13 in the form of a credit. The BET amount display unit 50 is a component for displaying the BET amount which is the number of coins bet on the aforementioned active pay lines.

Figure 4:
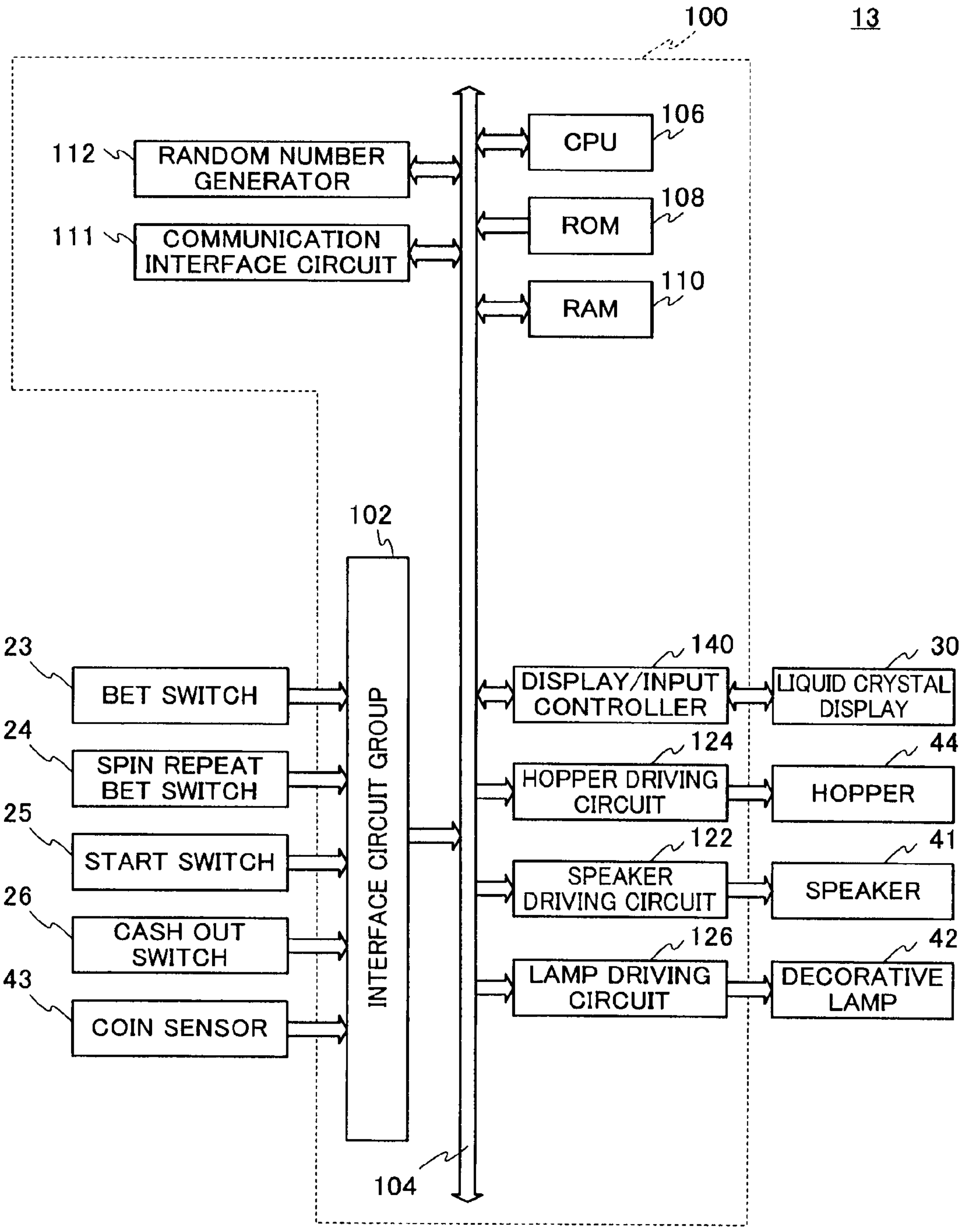
FIG. 4 is a block diagram which shows a controller of the gaming machine according to the embodiment of the present invention.

FIG. 4 is a block diagram which shows an electrical configuration of the game controller 100 of the gaming machine 13. As shown in FIG. 4, the game controller 100 of the gaming machine 13 is a micro computer, and includes an interface circuit group 102, an input/output bus 104, a CPU 106, ROM 108, RAM 110, a communication interface circuit 111, a random number generator 112, a speaker driving circuit 122, a hopper driving circuit 124, a lamp driving circuit 126, and a display/input controller 140.

The interface circuit group 102 is connected to the input/output bus 104. The input/output bus 104 performs input/output of data signals or address signals to/from the CPU 106.

Furthermore, the start switch 25 is connected to the interface circuit group 102. The start signal output from the start switch 25 is converted into a predetermined signal by the interface circuit group 102, and the input signal thus converted is supplied to the input/output bus 104.

Furthermore, the BET switch 23, the spin repeat bet switch 24, and the cash out switch 26 are connected to the interface circuit group 102. Each of the switching signals output from these switches 23, 24, and 26 is also supplied to the interface circuit group 102, and is converted into a predetermined signal by the interface circuit group 102. The switching signals thus converted are supplied to the input/output bus 104.

Furthermore, a coin sensor 43 is connected to the interface circuit group 102. The coin sensor 43 is a sensor for detecting the coins inserted into the coin insertion opening 22. The coin sensor 43 is provided in combination with the coin insertion opening 22. The sensing signal output from the coin sensor 43 is also supplied to the interface circuit group 102, and is converted into a predetermined signal by the interface circuit group 102. The sensing signal thus converted is supplied to the input/output bus 104.

The ROM 108 and the RAM 110 are connected to the input/output bus 104.

Upon receipt of the game start operation instruction input through the start switch 25, the CPU 106 reads out a game program, and executes the game. The game program has been programmed so as to instruct the CPU 106 to perform the following operation. That is to say, according to the game program, the CPU 106, via the display/input controller 140, displays on the liquid crystal display 30 an image of the five video reels commencing to scroll the symbols that are disposed on the five video reels. Then, the CPU 106 displays an image of the five video reels stopping such that the combination of the symbols on these five video reels is rearranged, whereupon a new combination of the symbols is made along the active pay lines. In a case that a particular winning combination of the symbols when they are stationary has been made along any one of the active pay lines, the CPU 106 pays out a predetermined amount of coins corresponding to the particular winning combination.

The ROM 108 stores: a control program for central control of the gaming machine 13; a program for executing routines shown in FIG. 8A through FIG. 10, and FIG. 22 through FIG. 24 (which will be referred to as the "routine execution program" hereafter); initial data for executing the control program; and various data tables used for determination processing. Note that the routine execution program includes the aforementioned game program etc. On the other hand, examples of the data tables include tables such as those shown in FIG. 7, FIG. 11 through FIG. 17, and FIG. 25 and FIG. 26. The RAM 110 temporarily stores flags, variables, etc., used for the aforementioned control program.

Furthermore, a communication interface circuit 111 is connected to the input/output bus 104. The communication interface circuit 111 is a circuit for communicating with a central controller 11 etc., via the network 12 including various kinds of networks such as a LAN.

Furthermore, the random number generator 112 for generating a random number is connected to the input/output bus 104. The random number generator 112 generates a random number in a predetermined range, e.g., a range between 0 and 65,535 (2.sup.16-1). Alternatively, an arrangement may be made in which the CPU 106 generates a random number by computation.

Furthermore, the speaker driving circuit 122 for driving the speaker 41 is connected to the input/output bus 104. The CPU 106 reads out the sound data stored in the ROM 108, and transmits the sound data thus read out to the speaker driving circuit 122 via the input/output bus 104, thereby providing predetermined sound effects generated by the speaker 41.

Furthermore, the hopper driving circuit 124 for driving the hopper 44 is connected to the input/output bus 104. Upon receipt of a cash out signal input from the cash out switch 26, the CPU 106 transmits a driving signal to the hopper driving circuit 124 via the input/output bus 104. As a result, the hopper 44 pays out an amount of coins corresponding to the credit remaining at the current point in time, as stored in a predetermined memory area of the RAM 110.

Also, instead of the payment of real coins, an arrangement may be made in which the credit data is stored in a data card or the like in the coin payment step. That is to say, with such a arrangement, the player has his/her own card which serves as a storage medium. Upon the player inserting this card into the gaming machine 13, the data with respect to the credit is stored in the card.

Also, a lamp driving circuit 126 is connected to the input/output bus 104 for driving the decorative lamps 42*a* and 42*b*. Under predetermined conditions according to a program stored in the ROM 108, the CPU 106 transmits a signal for driving these lamps, thereby causing the decorative lamps 42*a* and 42*b* to blink.

Furthermore, the display/input controller 140 is connected to the input/output bus 104. The CPU 106 creates an image display command corresponding to the state and results of the game, and outputs the image display command thus created to the display/input controller 140 via the input/output bus 104. Upon receipt of the image display command input from the CPU 106, the display/input controller 140 creates a driving signal for driving the liquid crystal display 30 according to the image display command thus input, and outputs the driving signal thus created to the liquid crystal display 30. As a result, a predetermined image is displayed on the liquid crystal display 30. In addition, the display/input controller 140 transmits the signal input through the touch panel 32 provided on the liquid crystal display 30 to the CPU 106 via the input/output bus 104 in the form of an input signal. Note that the image display commands include commands with respect to the payout amount display unit 48, commands with respect to the credit amount display unit 49, and commands with respect to the BET amount display unit 50.

Figure 5:
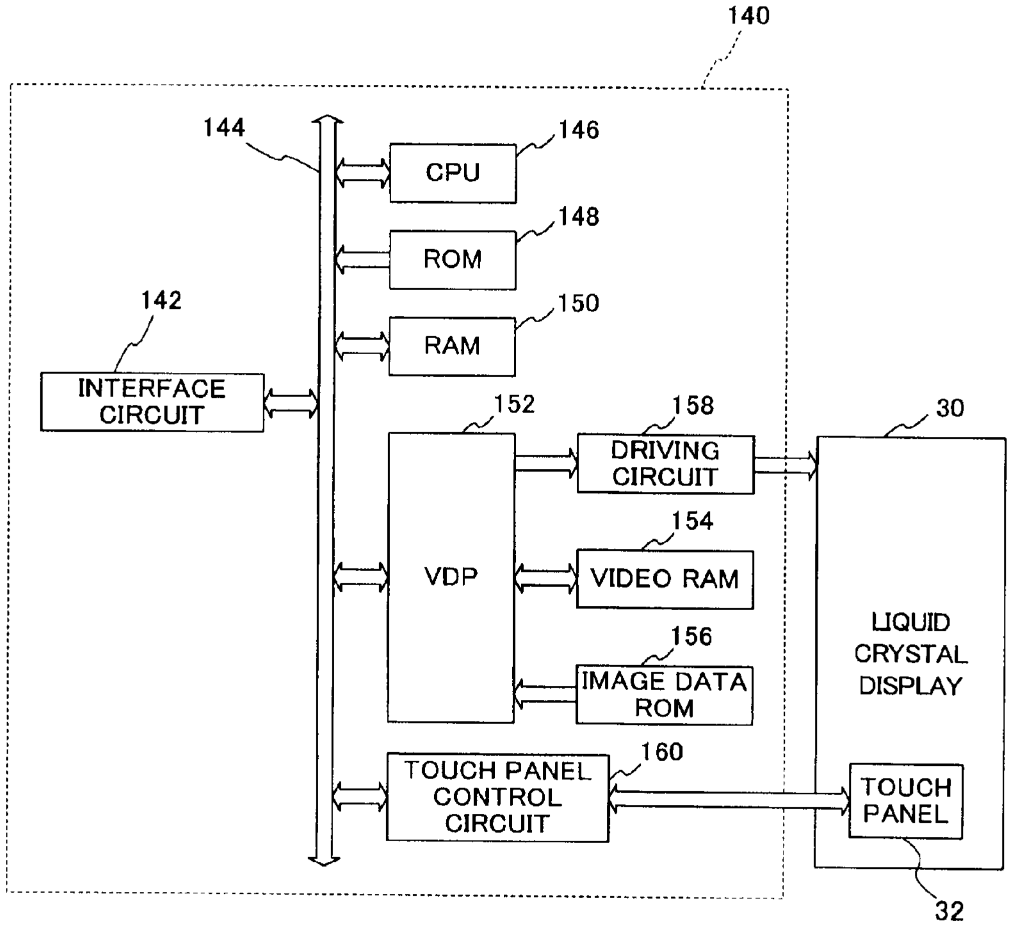
FIG. 5 is a block diagram which shows a display/input controller of the gaming machine according to the embodiment of the present invention.

FIG. 5 is a block diagram which shows an electrical configuration of the display/input controller 140 of the gaming machine 13. The display/input controller 140 of the gaming machine 13 is a sub-microcomputer for performing image display processing and input control for the touch panel 32. The display/input controller 140 includes an interface circuit 142, an input/output bus 144, a CPU 146, ROM 148, RAM 150, a VDP 152, video RAM 154, image data ROM 156, a driving circuit 158, and a touch panel control circuit 160.

The interface circuit 142 is connected to the input/output bus 144. The image display command output from the CPU 106 of the aforementioned game controller 100 is supplied to the input/output bus 144 via the interface circuit 142. The input/output bus 144 performs input/output of data signals or address signals to/from the CPU 146.

Furthermore, the ROM 148 and the RAM 150 are connected to the input/output bus 144. The ROM 148 stores a display control program for generating a driving signal, which is to be supplied to the liquid crystal display 30, according to an image display command received from the CPU 106 of the aforementioned game controller 100. On the other hand, the RAM 150 stores flags and variables used in the aforementioned display control program.

Furthermore, the VDP 152 is connected to the input/output bus 144. The VDP 152 includes a so-called sprite circuit, a screen circuit, a palette circuit, etc., and can perform various kinds of processing for displaying images on the liquid crystal display 30. With such an arrangement, the components connected to the VDP 152 include: the video RAM 154 for storing image data according to the image display command received from the CPU 106 of the aforementioned game controller 100; and the image data ROM 156 for storing various kinds of image data including the aforementioned image data for visual effects etc. Furthermore, the driving circuit 158 for outputting a driving signal for driving the liquid crystal display 30 is connected to the VDP 152.

The aforementioned CPU 146 instructs the video RAM 154 to store the image data which is to be displayed on the liquid crystal display 30 according to the image display command received from the CPU 106 of the aforementioned game controller 100 by reading out the display control program stored in the ROM 148 and by executing the program thus read out. Examples of the image display commands include various kinds of image display commands including the aforementioned image display commands for visual effects and the like.

The image data ROM 156 stores various kinds of image data including the aforementioned image data for visual effects and the like.

The touch panel control circuit 160 transmits to the CPU 106 the signals input via the touch panel 32, provided on the liquid crystal display 30, via the input/output bus 144 in the form of an input signal.

Figure 6:
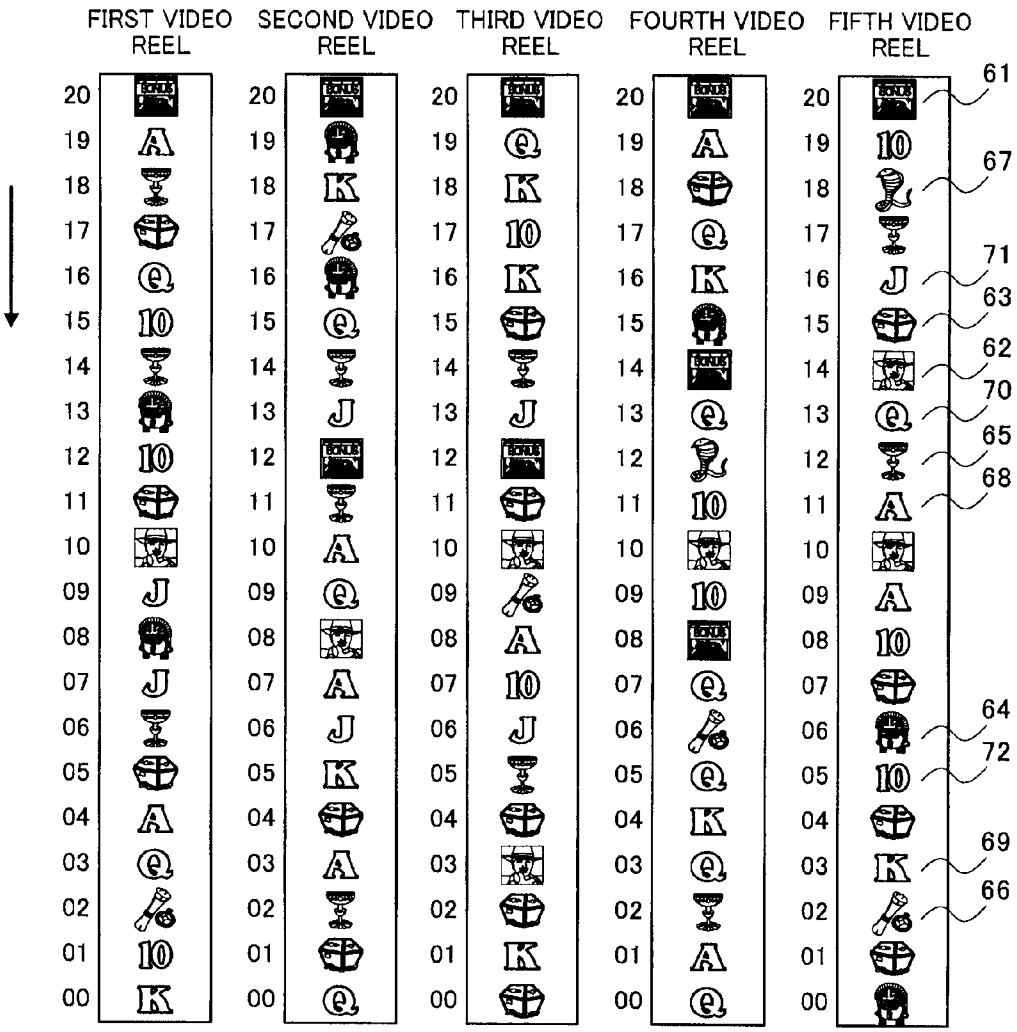
FIG. 6 is a diagram which shows symbol sequences each of which is displayed on the corresponding video reel of the gaming machine according to the embodiment of the present invention.

FIG. 6 shows symbol sequences which are depicted on the respective video reels 3A through 3E, and along each of which are disposed a sequence of 21 symbols. Note that the symbol sequence for the first video reel corresponds to the video reel 3A. The symbol sequence for the second video reel corresponds to the video reel 3B. The symbol sequence for the third video reel corresponds to the video reel 3C. The symbol sequence for the fourth video reel corresponds to the video reel 3D. The symbol sequence for the fifth video reel corresponds to the video reel 3E.

As shown in FIG. 6, the code numbers "00" through "20" are assigned to the respective symbols of the symbol sequences for the video reels 3A through 3E. The code numbers are stored (recorded) in the aforementioned ROM 108 (FIG. 4) in the form of a data table.

A symbol sequence is depicted on each of the video reels 3A through 3E. Each symbol sequence includes: a "BONUS" symbol (symbol 61) (which will simply be referred to as "BONUS" hereafter); a "WILD" symbol (symbol 62) (which will simply be referred to as "WILD" hereafter); a "TREASURE BOX" symbol (symbol 63) (which will simply be referred to as "TREASURE BOX" hereafter); a "GOLDEN MASK" symbol (symbol 64) (which will simply be referred to as "GOLDEN MASK" hereafter); a "HOLY CUP" symbol (symbol 65) (which will simply be referred to as "HOLY CUP" hereafter); a "COMPASS & MAP" symbol (symbol 66) (which will simply be referred to as "COMPASS & MAP" hereafter); a "SNAKE" symbol (symbol 67) (which will simply be referred to as "SNAKE" hereafter); an "A" symbol (symbol 68) (which will simply be referred to as "A" hereafter); a "K" symbol (symbol 69) (which will simply be referred to as "K" hereafter); a "Q" symbol (symbol 70) (which will simply be referred to as "Q" hereafter); a "J" symbol (symbol 71) (which will simply be referred to as "J" hereafter); and a "10" symbol (symbol 72) (which will simply be referred to as "10" hereafter). Each of the symbol sequences on the video reels 3A through 3E is moved by displaying a video image in which the corresponding video reels 3A through 3E are rotated in the forward direction.

With the present embodiment, the types of prizes prepared include a "BONUS" prize, a "WILD" prize, a "SNAKE" prize, a "TREASURE BOX" prize, a "GOLDEN MASK" prize, a "HOLY CUP" prize, a "COMPASS & MAP" prize, an "A" prize, a "K" prize, a "Q" prize, a "J" prize, and a "10" prize. The prize type information (prize type data) is control information that basically indicates each combination of symbols that provides a profit to the player in association with the prize (the number of coins to be paid out). Also, the prize type information is the control information which is used for a stop control operation for each of the video reels 3A through 3E, switching (transition) operation for the game state, a coin awarding operation, etc.

FIG. 7 shows a symbol disposition table. With the symbol disposition table, each code number that indicates the positions of the symbols that make up the aforementioned symbol sequences is registered in association with the corresponding symbols on the video reels 3A through 3E. Note that the first through fifth video reels correspond to the video reels 3A through 3E, respectively. In other words, the symbol disposition table provides the symbol information with respect to the symbol positions (code numbers) on the video reels 3A through 3E.

In FIG. 7, the aforementioned prize types "TREASURE BOX", "GOLDEN MASK", and "COMPASS & MAP" are abbreviated to "TREASURE", "MASK", and "COMPASS", respectively.

First Embodiment

Description will be made regarding a first embodiment with reference to FIG. 8A through FIG. 21. With the first embodiment, a player plays a mini game in a basic game. The number of free games is determined based upon the accumulated points won in the mini game. Subsequently, the game mode is switched to the free game mode. After the game mode has been switched to the free game mode, the free game is executed the predetermined number of times thus determined.

Figure 8A:
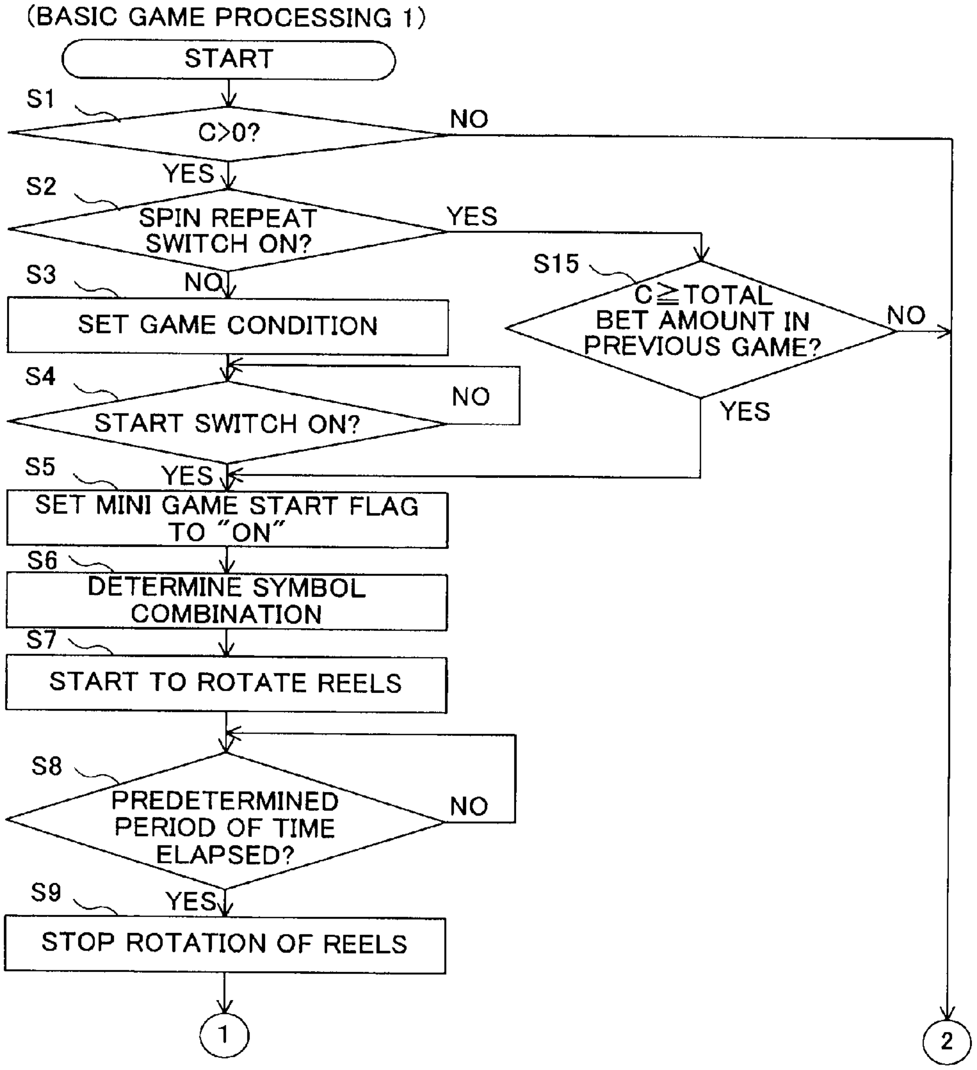
FIG. 8A and FIG. 8B show a flowchart for basic game processing 1 executed by the gaming machine according to the embodiment of the present invention.
Figure 8B:
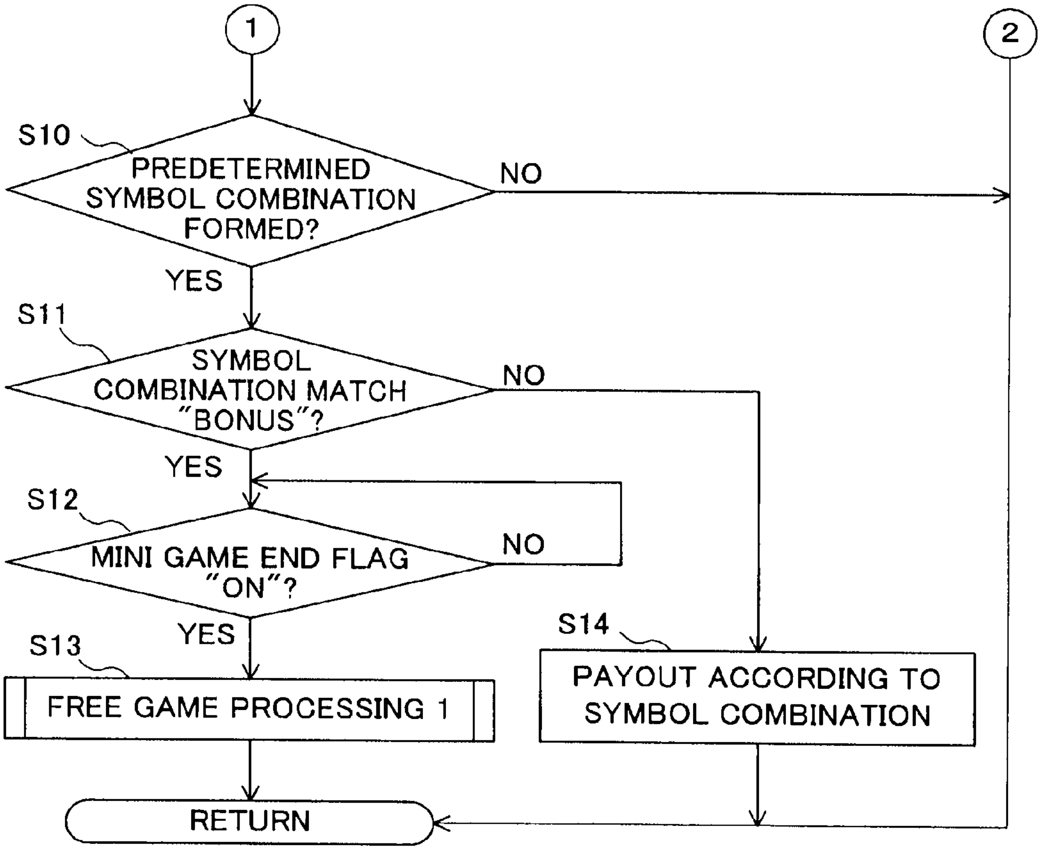

FIG. 8A and FIG. 8B are flowcharts which show a flow of the processing operation for the basic game of the gaming machine 13, which is executed by the game controller 100 of the gaming machine 13. The one routine shown in FIG. 8A and FIG. 8B corresponds to one unit of the game.

Furthermore, let us say that the gaming machine 13 is started up beforehand. Also, let us say that the variables used in the CPU 106 included in the game controller 100 have been initialized to predetermined values, thereby providing the normal operation of the gaming machine 13.

First, the CPU 106 included in the aforementioned game controller 100 determines whether or not any credit remains, which corresponds to the remaining amount of coins inserted by the player (Step S1). Specifically, the CPU 106 reads out the credit amount C stored in the RAM 110, and performs the processing based upon the credit amount C thus read out. In a case that the credit amount C is "0" (in a case of "NO" in the determination processing denoted by Step S1), the CPU 106 is not permitted to start the game. Accordingly, in this case, the CPU 106 ends this routine without involving any processing. On the other hand, in a case that the credit amount C is "1" or more (in a case of "YES" in the determination processing denoted by Step S1), the CPU 106 determines that there is remaining credit, and accordingly, the flow proceeds to Step S2 according to the instruction from the CPU 106.

In the following Step S2, the CPU 106 determines whether or not a pushing operation is performed on the spin repeat bet switch 24. In a case that the spin repeat bet switch 24 has been pushed, and accordingly, in a case of reception of an operation signal via the spin repeat switch 24 (in a case of "YES" in the determination processing denoted by Step S2), the CPU 106 switches the processing to Step S15. On the other hand, in a case of reception of no operation signal via the spin repeat switch 24 during a predetermined period of time (in a case of "NO" in the determination processing denoted by Step S2), the CPU 106 determines that the spin repeat bet switch 24 has not been pushed, and accordingly, the flow proceeds to Step S3 according to the instruction from the CPU 106.

In the following Step S3, the CPU 106 sets the game condition. Specifically, the CPU 106 determines the number of coins to be bet on the active pay lines set in the current game according to the user's operation via the BET switch 23. In this stage, the CPU 106 receives an operation signal generated by the user's operation performed via the BET switch 23. The CPU 106 determines the BET amount bet on each active pay line based upon the number of instances of reception of the BET switch operation signal, and stores the BET amounts thus determined in a predetermined memory region in the RAM 110. The CPU 106 reads out the credit amount C written to a predetermined memory region in the RAM 110. Then, the CPU 106 subtracts the total BET amount, which is the sum total of the BET amounts, from the credit amount C thus read out, and stores the value thus subtracted in a predetermined memory region in the RAM 110. Subsequently, the flow proceeds to Step S4 according to the instruction from the CPU 106.

In the following Step S4, the CPU 106 determines whether or not the start switch 25 is in the ON state, i.e., the CPU 106 stands by until the player operates the start switch 25. Upon the player operating the start switch 25, and accordingly, upon receipt of an operation signal via the start switch 25 (in a case of "YES" in the determination processing denoted by Step S4), the CPU 106 determines that the start switch 25 has been operated, and accordingly, the CPU 106 switches the processing to Step S5.

On the other hand, in a case that the flow has proceeded to Step S15, the CPU 106 determines whether or not the credit amount C is equal to or greater than the total bet amount bet on the previous game. In other words, the CPU 106 determines whether or not the player can start the game by pushing the spin repeat bet switch 24. Specifically, in a case that the spin repeat bet switch 24 has been pushed, and accordingly, in a case that the operation signal has been input from the aforementioned switch 24, the CPU 106 reads out the credit amount C and the BET amount bet on each of the active pay lines L1 to L9 in the previous game stored in the predetermined memory areas of the aforementioned RAM 110. Then, the CPU 106 determines whether or not the aforementioned credit amount C is equal to or greater than the total bet amount bet in the previous game based upon the relation between the credit amount C and the BET amounts thus read out. The CPU 106 performs processing based upon the determination results. In a case that determination has been made that the aforementioned credit amount C is less than the total bet amount bet on the previous game (in a case of "NO" in the processing in Step S15), the CPU 106 cannot start the game, and accordingly, the CPU 106 ends this routine without performing any processing. On the other hand, in a case that determination has been made that the aforementioned credit amount C is equal to or greater than the total bet amount bet in the previous game (in a case of "YES" in the processing in Step S15), the CPU 106 subtracts the total bet amount bet in the previous game from the aforementioned credit amount C, and stores the subtracted value in a predetermined area of the RAM 110. Subsequently, the flow proceeds to Step S5 according to the instruction from the CPU 106.

In the following Step S5, the CPU 106 performs processing in which the mini game start flag is set to "ON". Specifically, the CPU 106 writes the data that indicates that the mini game start flag is in the "ON" state to the mini game start flag storage region in the RAM 110. Subsequently, the flow proceeds to Step S6 according to the instruction from the CPU 106.

In the following Step S6, the CPU 106 performs combination determination processing. Specific description will be made below regarding the combination determination processing.

In the aforementioned combination determination processing, first, the CPU 106 determines the combinations of the symbols when they are stationary along the aforementioned active pay lines. Specifically, the CPU 106 issues a command for the random number generator 112 to generate a random number, thereby extracting a random number in a predetermined range (in a range of "01" to "65535" in the present embodiment) generated by the random number generator 112. The CPU 106 stores the random number thus extracted in a predetermined memory area of the RAM 110. Note that description is being made in the present embodiment regarding an arrangement in which the random number is generated by the random number generator 112, which is a separate component from the aforementioned CPU 106. Also, an arrangement may be made in which the random number is generated by computation processing by the CPU 106 without involving the random number generator 112. The CPU 106 reads out a random number table and a particular winning combination table (random number table for a basic game (see FIG. 11)), each of which is stored in the ROM 108. Then, the CPU 106 stores, in a predetermined memory area of the RAM 110, the random number table and the particular winning combination thus read out. Note that the CPU 106 controls display of the video reels when they are stationary for each reel based upon the aforementioned random number table. Furthermore, the CPU 106 reads out the random number table and the particular winning combination table stored in the predetermined area of the aforementioned RAM 110. Then, the CPU 106 determines the combination of the symbols when they are stationary with respect to the aforementioned active pay lines with reference to the aforementioned random number table using the random number stored in the predetermined memory region of the aforementioned RAM 110 as a parameter. Upon determination of particular winning combinations, the CPU 106 stores the particular winning combination data thus determined in a predetermined memory area of the RAM 110. Then, the CPU 106 reads out the random number and the particular winning combination data stored in the predetermined memory area of the RAM 110, and determines the combination to be displayed of the symbols when they are stationary based upon the random number and the particular winning combination data thus read out. In this stage, a symbol disposition table stored in the ROM 108 is read out by the CPU 106. The symbol disposition table thus read out is stored in a predetermined memory area of the RAM 110, and is used as reference data. The CPU 106 stores the data for the stationary symbols thus determined in a predetermined memory area of the RAM 110. Alternatively, an arrangement may be made in which the symbols when they are stationary are determined for each reel using the aforementioned random number table.

Upon determination of the combination of the symbols when they are stationary with respect to the aforementioned active pay lines, the CPU 106 determines whether or not the combination of the symbols when they are stationary with respect to the active pay lines matches any one of the particular winning combinations. In a case that the combination of the symbols when they are stationary with respect to the active pay lines matches any one of the particular winning combinations, the CPU 106 activates a flag, which indicates that the player has won the prize that corresponds to the kind of particular winning combination, in order to provide the prize that accords with the particular winning combination of symbols with respect to the active pay lines thus determined as described above. The activated flag, which indicates the player has won a prize, is stored in a predetermined area of the RAM 110 according to the instruction from the CPU 106. On the other hand, in a case that the combination of the symbols when they are stationary with respect to the active pay lines matches any one of the other combinations, i.e., the losing combinations, the CPU 106 does not activate the flag which indicates that the player has won a prize. Subsequently, the flow proceeds to Step S7 according to the instruction from the CPU 106.

In the following Step S7, the CPU 106 displays an image of the five video reels 3A through 3E starting to rotate. Specifically, the CPU 106 displays an image of the video reels 3A through E3 starting to rotate in a predetermined order or at the same time according to the symbol disposition table stored in the aforementioned RAM 110.

Upon beginning to display a video image of the video reels 3A through 3E starting to rotate, the CPU 106 waits for a predetermined period of time to elapse (Step S8). After the predetermined period of time has elapsed (in a case of "YES" in the determination processing in Step S8), the CPU 106 instructs the video reels 3A through 3E to automatically stop rotating (Step S9). Specifically, the CPU 106 displays an image of the video reels 3A through 3E stopping to rotate in a predetermined order or at the same time such that the symbols when they are stationary, which correspond to a particular winning combination as determined in the aforementioned Step S6, is displayed in a display region that can be observed by the player. Subsequently, the flow proceeds to Step S10 according to the instruction from the CPU 106.

In the following Step S10, the CPU 106 determines whether or not a predetermined symbol combination has been formed based upon the results of the combination determination processing performed in Step S6. Specifically, the CPU 106 makes this determination based upon the state of the flag that indicates whether or not the player has won a prize with respect to the active pay lines stored in the predetermined memory area of the aforementioned RAM 110. In a case that the flag, which indicates that the player has won a prize, has not been activated, i.e., in a case that the symbol combination matches any one of the "other" combinations, which are combinations other than the particular winning combinations (in a case of "NO" in the determination processing in Step S10), the CPU 106 determines that the particular winning combination has not been formed, and ends this routine. On the other hand, in a case that the flag, which indicates that the player has won a prize, has been activated, i.e., in a case that the symbol combination matches any one of the combinations other than the "other" combinations (in a case of "YES" in the determination processing in Step S10), the flow proceeds to Step 11 according to the instruction from the CPU 106.

In the following Step S11, the CPU 106 determines whether or not the symbol combination thus formed in the combination determination processing performed in Step S6 is "BONUS". Specifically, in a case that the particular winning combination is "BONUS" (in a case of "YES" in the determination processing in Step S11), the flow proceeds to Step S12 according to the instruction from the CPU 106. On the other hand, in a case that the particular winning combination is not "BONUS" (in a case of "NO" in the determination processing in Step S11), the flow proceeds to Step S14 according to the instruction from the CPU 106.

In the following Step S12, the CPU 106 determines whether or not the mini game end flag is in the ON state. Specifically, the CPU 106 determines whether or not the data that indicates that the mini game end flag is in the ON state has been written to a mini game end flag region in the RAM 110. In a case that the CPU 106 determines that the mini game end flag is in the ON state, the flow proceeds to Step S13. On the other hand, in a case that the CPU 106 determines that the mini game end flag is not in the ON state, the flow proceeds to Step S12.

In a case that the flow proceeds to Step S13, the CPU 106 performs free game processing 1. Subsequently, the CPU 106 ends this routine.

On the other hand, in a case that the flow proceeds to Step S14, the CPU 106 pays out a predetermined amount of coins corresponding to the particular winning combination. Specifically, the CPU 106 calculates, with reference to the payout table, the amount of coins to be paid out for the aforementioned particular winning combination. The CPU 106 reads out the credit amount stored in the aforementioned predetermined memory area of the RAM 110. Then, the CPU 106 calculates the sum total of the payout amount thus calculated and the credit amount thus read out, and stores the value thus calculated in a predetermined memory area of the RAM 110. The CPU 106 displays the aforementioned value thus stored on the credit amount display unit 49. Subsequently, the CPU 106 ends this routine.

Figure 9:
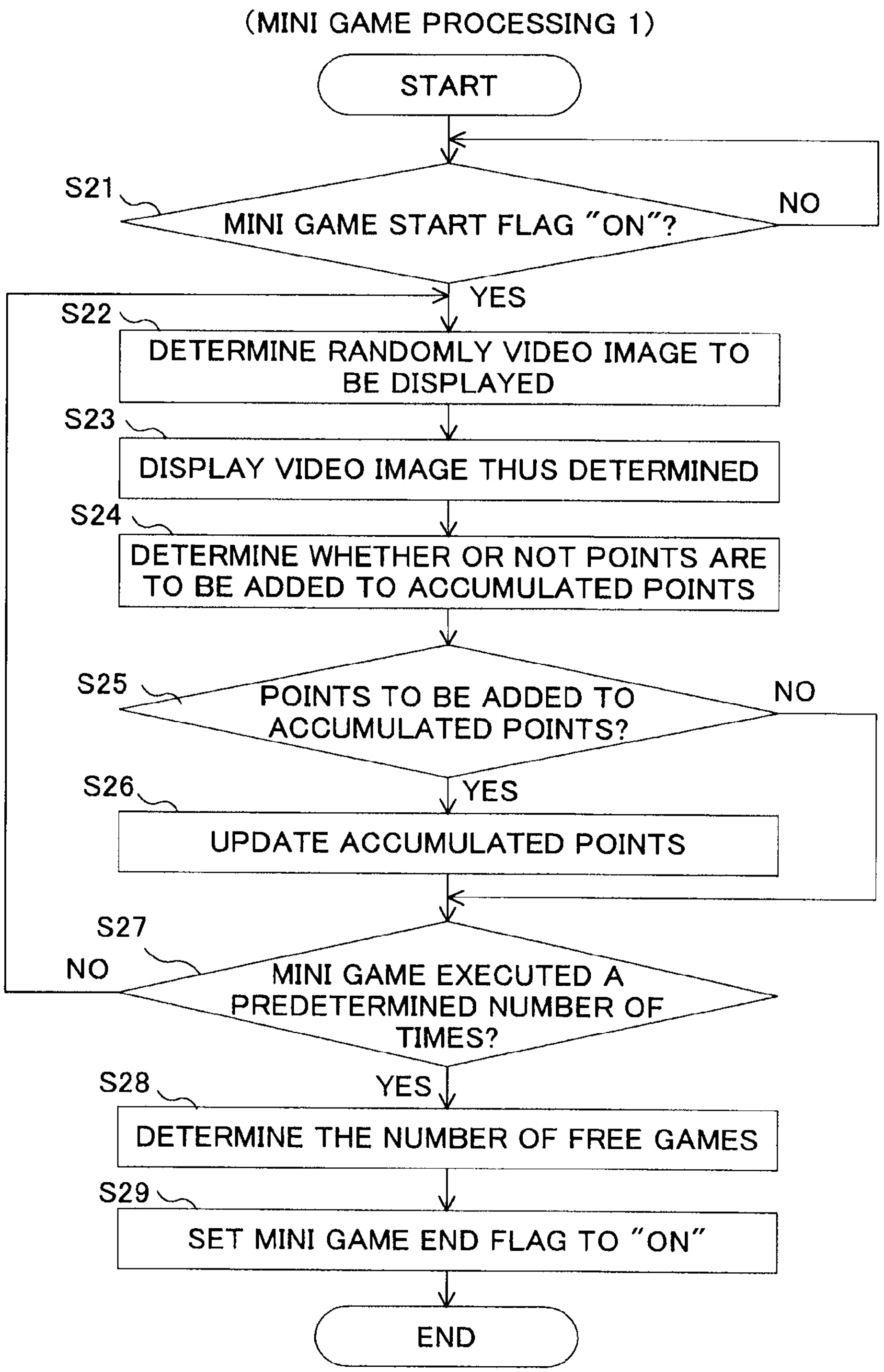
FIG. 9 is a flowchart for mini game processing 1 executed by the gaming machine according to the embodiment of the present invention.

Description will be made regarding mini game processing 1 with reference to FIG. 9.

In Step S21, the CPU 106 determines whether or not the mini game start flag is in the ON state. Specifically, the CPU 106 determines whether or not the data that indicates that the mini game start flag is in the ON state has been written to a mini game start flag region in the RAM 110. In a case that the CPU 106 has determined that the mini game start flag is in the ON state, the flow proceeds to Step S22. On the other hand, in a case that the CPU 106 has determined that the mini game start flag is not in the ON state, the flow proceeds to Step S21.

In Step S22, the CPU 106 randomly determines the image to be displayed on the liquid crystal display 30, following which the flow proceeds to Step S23. Specifically, the CPU 106 determines the image to be displayed from among a video image of a first enemy character, a video image of a second enemy character, and a video image of a third enemy character, with reference to a video image type determination random number table described later with reference to FIG. 12.

In Step S23, the CPU 106 displays on the liquid crystal display 30 the image that has been determined in Step S22 to be the image to be displayed, following which the flow proceeds to Step S24. Specifically, the CPU 106 extracts the image thus determined from the ROM 108, and displays the image thus extracted on the liquid crystal display 30 via the display/input controller 140.

In Step S24, the CPU 106 determines whether or not the points are to be added to the accumulated points, whereupon the flow proceeds to Step S25. Here, the term "accumulated points" as used here represent the points which are to be updated according to the results of executing the mini game, and are stored in a predetermined storage region of the RAM 110. Specifically, in Step S24, the CPU 106 determines whether or not the points are to be added to the accumulated points with reference to the points addition determination random number tables 1 through 3. Here, the points to be added are defined in a points table described later with reference to FIG. 13.

In Step S25, the CPU 106 checks whether or not determination has been made that the points are to be added to the accumulated points. In a case that determination has been made that the addition is to be made, the flow proceeds to Step S26. On the other hand, in a case that determination has not been made that the addition is to be made, the flow proceeds to Step S27.

In Step S26, the CPU 106 updates the accumulated points, following which the flow proceeds to Step S27. Specifically, the CPU 106 reads out the points to be added from the points table described later with reference to FIG. 13, and adds the points thus read out to the accumulated points stored in the predetermined storage region of the RAM 110, thereby updating the accumulated points.

In Step S27, the CPU 106 determines whether or not the mini game has been executed a predetermined number of times. In a case that determination has been made that the mini game has been executed the predetermined number of times, the flow proceeds to Step S28. On the other hand, in a case that determination has not been made that the mini game has been executed the predetermined number of times, the flow proceeds to Step S22. Specifically, the CPU 106 reads out the number of instances of execution of the mini game, and determines whether or not the number of instances of execution of the mini game has reached the predetermined number.

In Step S28, the CPU 106 determines the number of free games, following which the flow proceeds to Step S29. Specifically, the CPU 106 determines the number of free games according to the accumulated points with reference to a free games table described later with reference to FIG. 17.

In Step S29, the CPU 106 sets the mini game end flag to the ON state. Specifically, the CPU 106 writes the data that indicates that the mini game end flag is in the ON state to the mini game end flag storage region in the RAM 110. Subsequently, the CPU 106 ends this routine.

Figure 10:
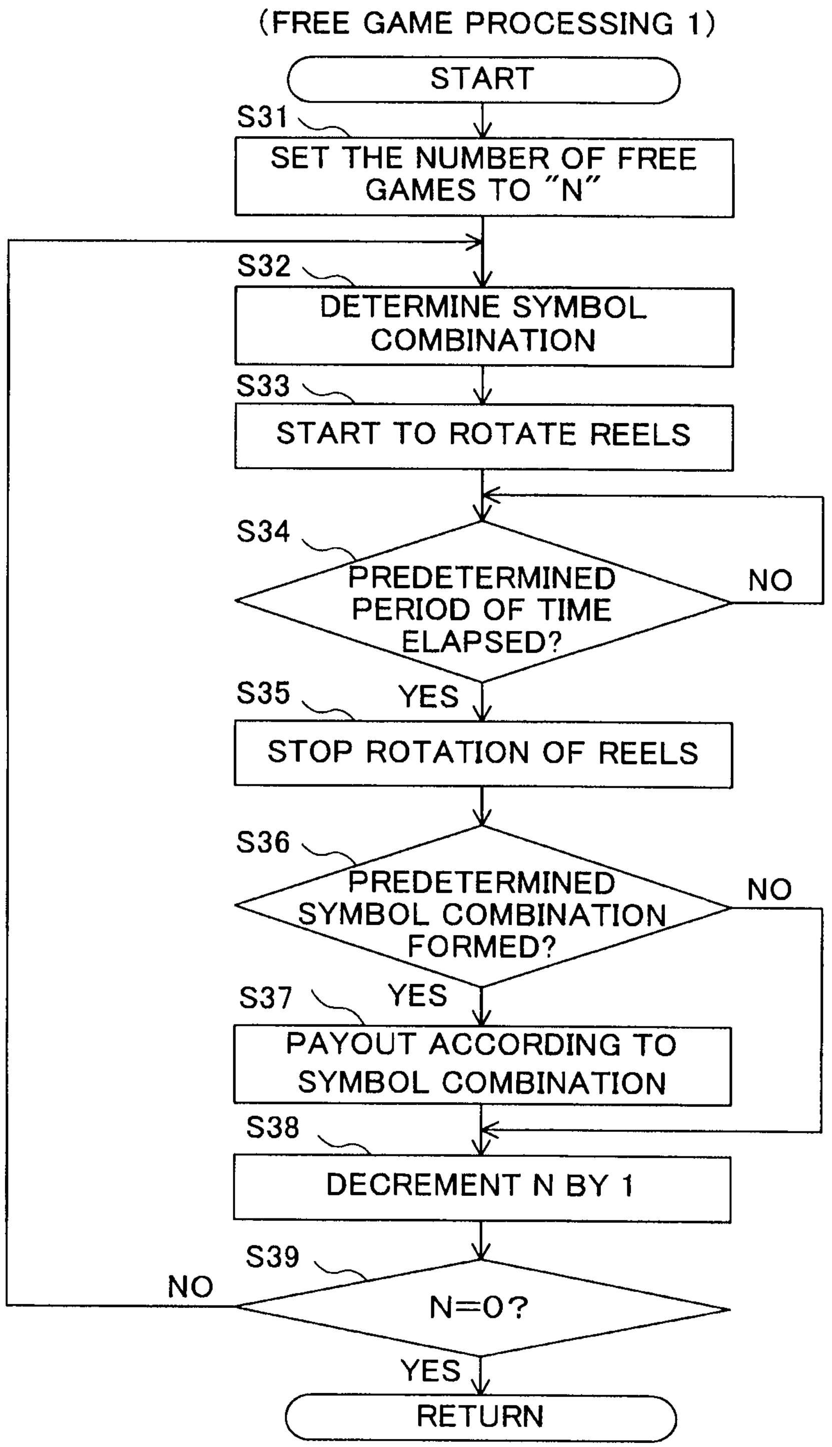
FIG. 10 is a flowchart for free game processing 1 executed by the gaming machine according to the embodiment of the present invention.

Description will be made regarding the free game processing 1 with reference to FIG. 10.

In Step S31, the CPU 106 sets the number of free games to N, following which the flow proceeds to Step S32. The number of free games is as determined in Step S28 described above with reference to FIG. 9.

In the following Step S32, the CPU 106 performs the symbol combination determination processing, following which the flow proceeds to Step S33. Specifically, the symbol combination determination processing is approximately the same as that performed in Step S6 described above with reference to FIG. 8. The point of difference is that the CPU 106 uses a free game random number table (see FIG. 25) as a reference table.

Returning to FIG. 10, in Step S33, the CPU 106 displays an image of the video reels 3A through 3E starting to rotate, following which the flow proceeds to Step S34. Specifically, this processing is the same as that in Step S7 described above with reference to FIG. 8.

Returning to FIG. 10, in Step S34, the CPU 106 determines whether or not a predetermined period of time has elapsed. In a case that the predetermined period of time has elapsed, the flow proceeds to Step S35. On the other hand, in a case that the predetermined period of time has not elapsed, the flow proceeds to Step S34. Specifically, this processing is the same as that in Step S8 described above with reference to FIG. 8.

Returning to FIG. 10, in Step S35, the CPU 106 displays an image of the video reels 3A through 3E stopping to rotate, following which the flow proceeds to Step S36. Specifically, this processing is the same as that in Step S9 described above with reference to FIG. 8.

Returning to FIG. 10, in Step S36, the CPU 106 determines whether or not a predetermined symbol combination has been formed. In a case that the predetermined symbol combination has been formed, the flow proceeds to Step S37. On the other hand, in a case that the predetermined symbol combination has not been formed, the flow proceeds to Step S38. Specifically, this processing is the same as that in Step S10 described above with reference to FIG. 8.

Returning to FIG. 10, in Step S37, the CPU 106 performs payout processing according to the symbol combination, following which the flow proceeds to Step S38. Specifically, the CPU 106 calculates the amount of coins to be paid out according to the symbol combination that provides a prize, with reference to a free game payout table (not shown). The CPU 106 reads out the credit amount stored in a predetermined memory region in the RAM 110. Then, the CPU 106 adds the aforementioned amount thus calculated to the credit amount thus read out, and stores the value thus calculated in a predetermined memory region in the RAM 110. The CPU 106 displays the value thus stored on the credit amount display unit 49.

In Step S38, the CPU 106 decrements by 1 the number of free games N, following which the flow proceeds to Step S39.

In Step S39, the CPU 106 determines whether or not N is equal to 0. In a case that N is not equal to 0, the flow proceeds to Step S32. On the other hand, in a case that N is equal to 0, the CPU 106 ends this routine.

Description will be made regarding a basic game random number table with reference to FIG. 11. In the basic game random number table, each particular winning combination that provides a prize is registered in association with a corresponding random number range and its determination probability. With such an arrangement, a random number is extracted in a range of "0" to "65535". Accordingly, in the combination determination processing (Step S6 in FIG. 8), in a case that a random number has been extracted in a range of "0" to "299", determination is made in the gaming machine 13 that a particular winning combination that provides a "BONUS" prize is to be provided as the final result of the basic game. In other words, the probability is "300/65536" that the combination of symbols when they are stationary will match the particular winning combination for providing the "BONUS" prize.

Description will be made regarding a video image type determination random number table with reference to FIG. 12. The video image type determination random number table is a reference table used by the CPU 106 to determine one video image from among the video images of the enemy character 1 through the enemy character 3. Let us consider a case in which the random number generator 112 has generated the random number "13000" in the processing in which the video image to be displayed is randomly determined (Step S22 in FIG. 9), for example. In this case, the random number thus generated belongs to the random number range "0 to 29999", and accordingly, determination is made that the video image to be displayed is the "enemy character 1" video image.

Description will be made regarding the points table with reference to FIG. 13. The points table is a reference table used by the CPU 106 to perform addition processing in which the points associated with the video image thus displayed are added to the accumulated points. In a case that the points in the accumulated points update processing (Step S26 in FIG. 9) correspond to the first enemy character, the CPU 106 adds "10" points to the accumulated points.

Description will be made regarding a points addition determination random number table 1 with reference to FIG. 14. The points addition determination random number table 1 is a reference table used by the CPU 106 in a case that a hero character 80 has the experience value of "0 to 50" in the mini game. The term "experience value" as used here represents the sum total of the accumulated number of instances of execution of the mini game and the accumulated points. For example, let us consider a case in which the random number generator 112 has generated the random number "3000" in the determination processing in which determination is made whether or not the points are to be added to the accumulated points (Step S24 in FIG. 9). In this case, the random number 3000 thus generated belongs to the random number range of "0 to 9999", resulting in the determination that "the hero character defeats the enemy character 1". Accordingly, determination is made that the "10" points associated with the first enemy character 81 are added to the accumulated points.

Description will be made regarding a points addition determination random number table 2 with reference to FIG. 15. The points addition determination random number table 2 is a reference table used by the CPU 106 in a case that the hero character 80 has the experience value of "51 to 100" in the mini game. In the points addition determination random number table 2, the probabilities that the hero character 80 will defeat the enemy character 1 through the enemy character 3 are higher than those in the points addition determination table 1 shown in FIG. 14.

Description will be made regarding a points addition determination random number table 3 with reference to FIG. 16. The points addition determination random number table 3 is a reference table used by the CPU 106 in a case that the hero character 80 has the experience value of "101 or more" in the mini game. In the points addition determination random number table 3, the probabilities that the hero character 80 will defeat the enemy character 1 through the enemy character 3 are higher than those in the points addition determination table 2 shown in FIG. 15.

As described with reference to FIGS. 14 through 16, the higher the experience value is, the higher is the probability that the hero character 80 will defeat the first enemy character through the third enemy character. Accordingly, the probability that the accumulated points will be updated such that the points will be added to the accumulated points is increased according to the accumulated number of instances of execution of the mini game or the accumulated points, i.e., according to the value that determines the experience value.

With the present embodiment, the probability that the accumulated points will be updated is determined according to the experience value. The present invention is not restricted to such an arrangement. Also, the probability that the accumulated points will be updated may be randomly determined, or may be determined according to the accumulated points. Also, the probability that the accumulated points will be updated may be determined according to the accumulated number of instances of execution of the mini game.

Description will be made regarding the free games table with reference to FIG. 17. The free games table is a reference table used by the CPU 106 to determine the number of free games according to the accumulated points. For example, in a case that the accumulated points are "70" in the free games determination processing (Step S28 in FIG. 9), the number of free games is determined to be "100".

With the present embodiment, the number of free games increases according to the increase in the accumulated points obtained as a result of repeated instances of execution of the mini game. Such an arrangement increases the player's level of interest in the game. This offers a game with further enhanced entertainment value.

FIGS. 18 through 21 are diagrams which show video images that provide visual effects for the mini game. In FIGS. 18 through 21, a video image for the basic game is displayed in the upper display region of the liquid crystal display 30. On the other hand, the lower display region thereof displays a video image for the mini game.

Figure 18:
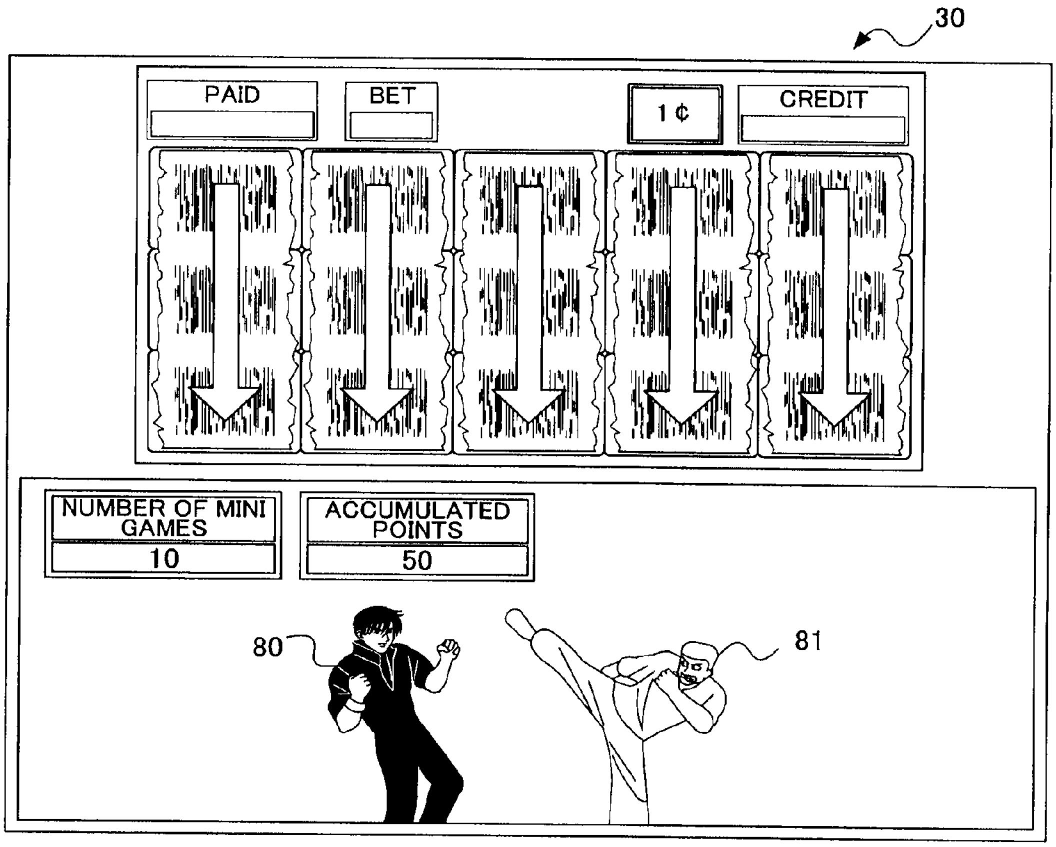
FIG. 18 shows an example of a display screen displayed in the mini game executed by the gaming machine according to the embodiment of the present invention.

Now, description will be made regarding the video image for the mini game shown in FIG. 18. FIG. 18 shows a scene in which the hero character 80 fights the first enemy character 81. Furthermore, FIG. 18 shows a state in which the number of instances of execution of the mini game is 10, and the accumulated points are 50. With such an arrangement, the video image for the first enemy character 81 is selected in the determination processing in which the image to be displayed is randomly determined (Step S22 in FIG. 9), thereby displaying the video image for the mini game.

Figure 19:
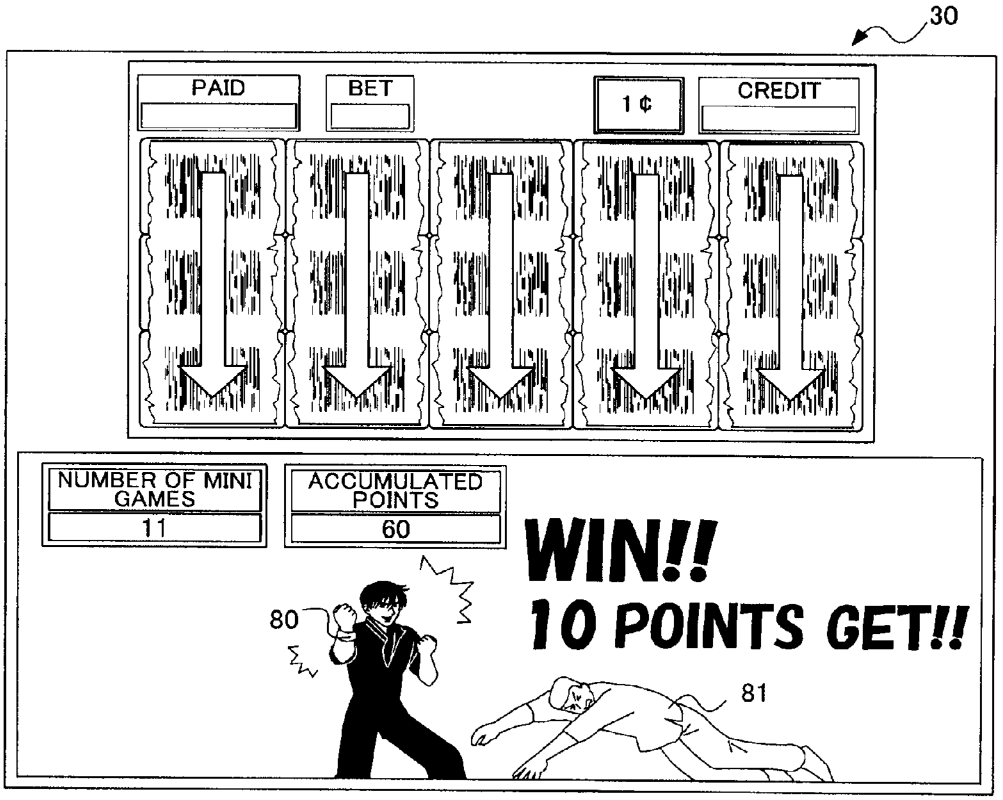
FIG. 19 shows an example of the display screen displayed in the mini game executed by the gaming machine according to the embodiment of the present invention.

Description will be made regarding the video image for the mini game shown in FIG. 19. FIG. 19 shows a scene in which the hero character 80 has defeated the first enemy character 81. Furthermore, FIG. 19 shows a state in which the number of instances of execution of the mini game has changed to 11 as a result of being incremented by 1, and the accumulated points have changed to 60 by 10 points having been added to the accumulated points as a result of the victory over the first enemy character 81. Furthermore, a headline "WIN!! 10 POINTS GET!!" is displayed, which indicates that 10 points have been added to the accumulated points as a result of the victory over the first enemy. With such an arrangement, such a video image for the mini game is displayed in a case that determination has been made that the hero character 80 has won a victory over the first enemy character 81 in the determination processing in which determination is made whether or not the points are to be added to the accumulated points (Step S24 in FIG. 9).

Figure 20:
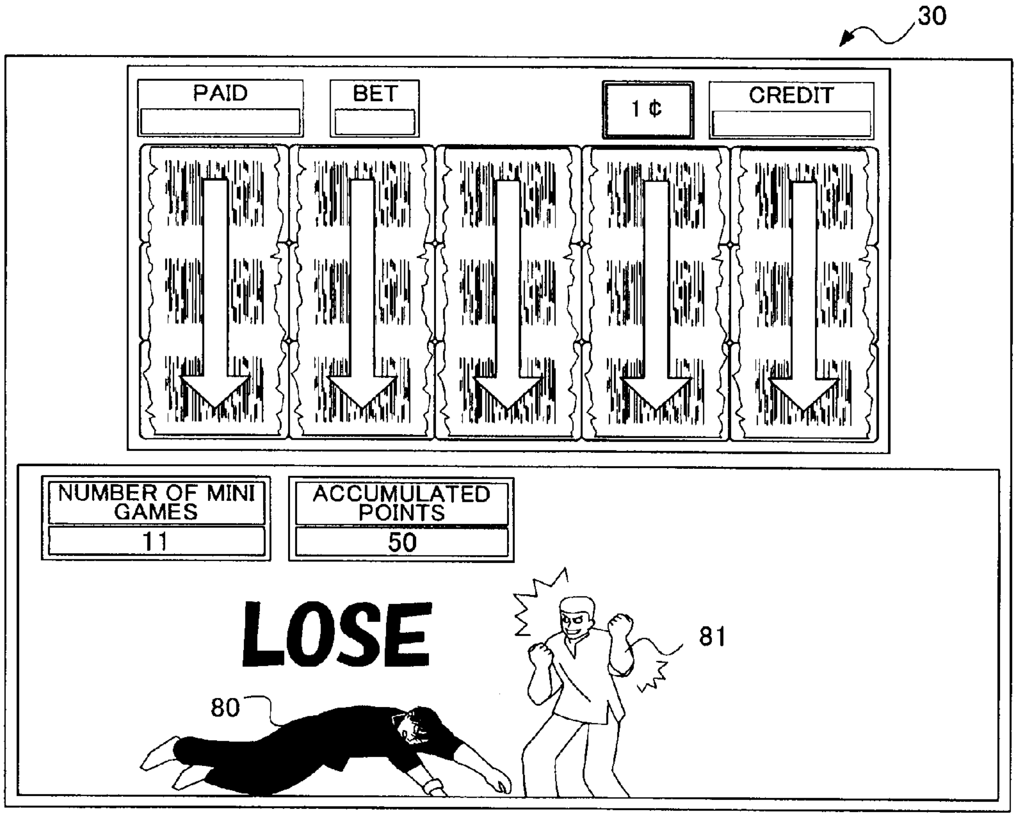
FIG. 20 shows an example of the display screen displayed in the mini game executed by the gaming machine according to the embodiment of the present invention.

Description will be made regarding a video image for the mini game shown in FIG. 20. FIG. 20 shows a scene in which the hero character 80 is defeated by the first enemy character 81. Furthermore, FIG. 20 shows a state in which the number of instances of execution of the mini game has changed to 11 as a result of being incremented by 1, and the accumulated points have not been updated, and accordingly, the accumulated points remain 50. With such an arrangement, such a video image for the mini game is displayed in a case that determination has not been made that the hero character 80 has won a victory over the first enemy character 81 in the determination processing in which determination is made whether or not the points are to be added to the accumulated points (Step S24 in FIG. 9).

Figure 21:
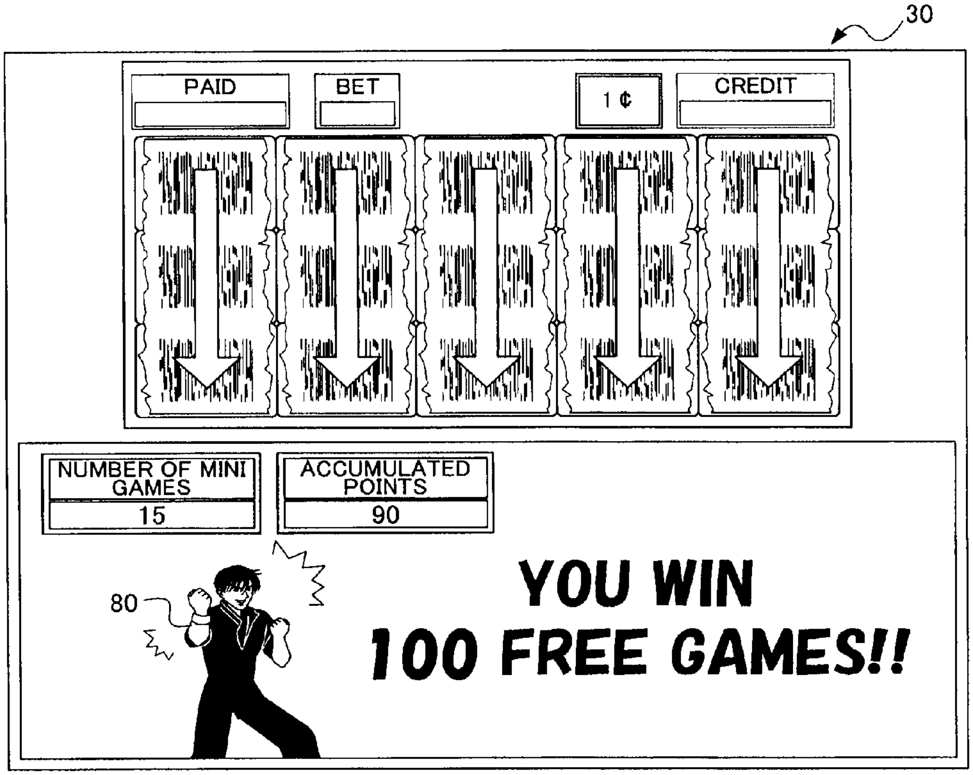
FIG. 21 shows an example of the display screen displayed in the mini game executed by the gaming machine according to the embodiment of the present invention.

Description will be made regarding a video image for the mini game shown in FIG. 21. FIG. 21 shows a state in which, after the mini game has ended, the number of instances of execution of the mini game has reached 15, and the accumulated points have reached 90. Furthermore, FIG. 21 shows a scene in which the hero character 80 celebrates the results. Furthermore, a headline "You win 100 free games!!" is displayed, which indicates that determination has been made that the player has won 100 free games. With such an arrangement, such a video image for the mini game is displayed in a case that determination has been made that the player has won 100 free games in the free games determination processing (Step S28 in FIG. 9).

Description will be made regarding a second embodiment with reference to FIG. 22 through FIG. 27, FIG. 12 through FIG. 16, and FIG. 18 through FIG. 20. With the second embodiment, a player plays a mini game in a basic game. The number of extra free games is determined based upon the accumulated points won in the mini game. Subsequently, the game mode is switched to the extra free game mode. After the game mode has been switched to the extra free game mode, the extra free game is executed the predetermined number of times thus determined.

Figure 22:
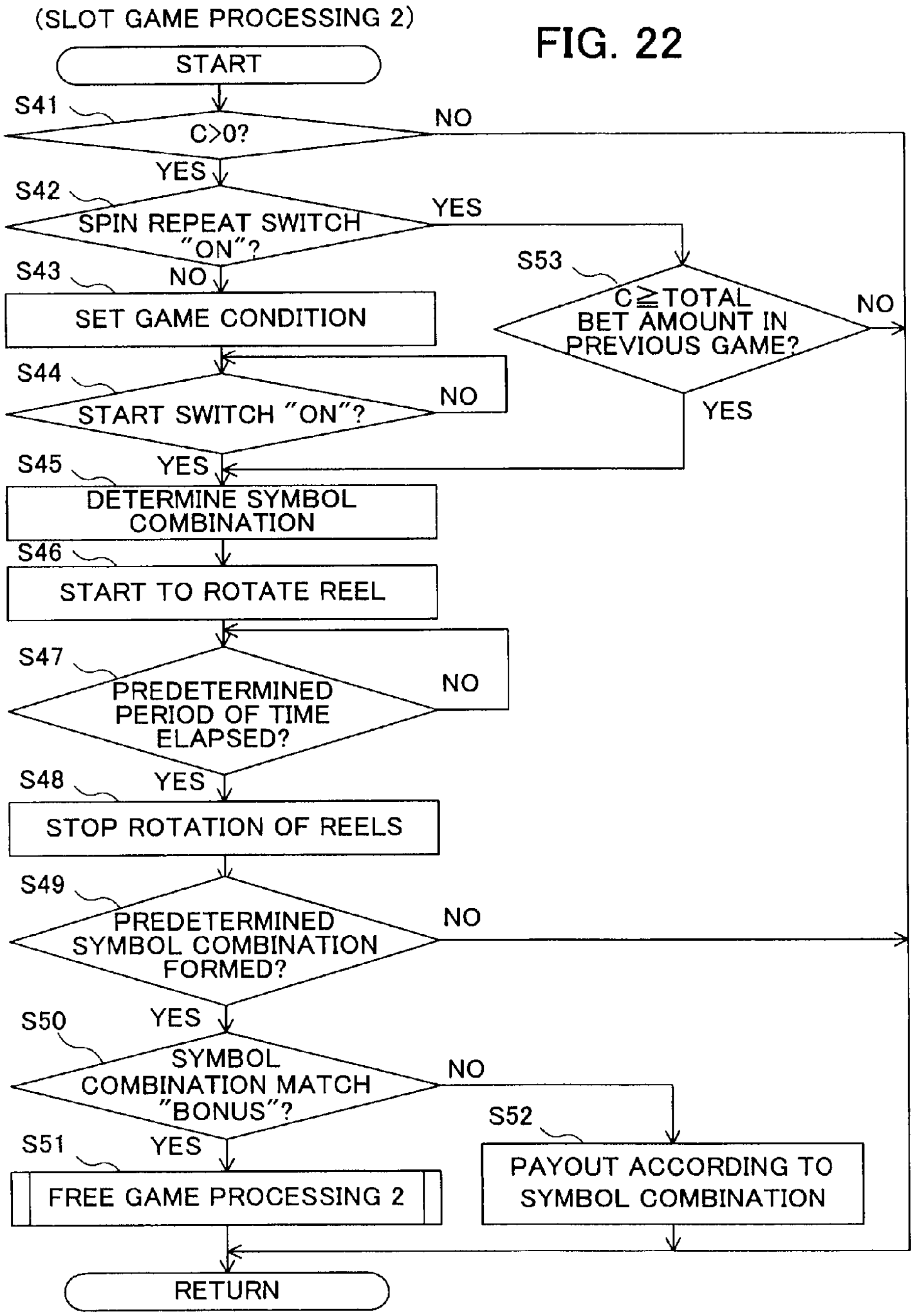
FIG. 22 is a flowchart for basic game processing 2 executed by the gaming machine according to the embodiment of the present invention.

FIG. 22 is a flowchart which shows a flow of the processing operation for the game of the gaming machine 13, which is executed by the game controller 100 of the gaming machine 13. The one routine shown in FIG. 22 corresponds to one unit of the game.

Furthermore, let us say that the gaming machine 13 is started up beforehand. Also, let us say that the variables used in the CPU 106 included in the game controller 100 have been initialized to predetermined values, thereby providing the normal operation of the gaming machine 13.

First, the CPU 106 included in the aforementioned game controller 100 determines whether or not any credit remains, which corresponds to the remaining amount of coins inserted by the player (Step S41). Specifically, the CPU 106 reads out the credit amount C stored in the RAM 110, and performs the processing based upon the credit amount C thus read out. In a case that the credit amount C is "0" (in a case of "NO" in the determination processing denoted by Step S41), the CPU 106 is not permitted to start the game. Accordingly, in this case, the CPU 106 ends this routine without involving any processing. On the other hand, in a case that the credit amount C is "1" or more (in a case of "YES" in the determination processing denoted by Step S41), the CPU 106 determines that there is remaining credit, and accordingly, the flow proceeds to Step S42 according to the instruction from the CPU 106. In the following Step S42, the CPU 106 determines whether or not a pushing operation is performed on the spin repeat bet switch 24. In a case that the spin repeat bet switch 24 has been pushed, and accordingly, in a case of reception of an operation signal via the spin repeat switch 24 (in a case of "YES" in the determination processing denoted by Step S42), the CPU 106 switches the processing to Step S53. On the other hand, in a case of reception of no operation signal via the spin repeat switch 24 during a predetermined period of time (in a case of "NO" in the determination processing denoted by Step S42), the CPU 106 determines that the spin repeat bet switch 24 has not been pushed, and accordingly, the flow proceeds to Step S43 according to the instruction from the CPU 106.

In the following Step S43, the CPU 106 sets the game condition. Specifically, the CPU 106 determines the number of coins to be bet on the active pay lines set in the current game according to the user's operation via the BET switch 23. In this stage, the CPU 106 receives an operation signal generated by the user's operation performed via the BET switch 23. The CPU 106 determines the BET amount bet on each active pay line based upon the number of instances of reception of the BET switch operation signal, and stores the BET amounts thus determined in a predetermined memory region in the RAM 110. The CPU 106 reads out the credit amount C written to a predetermined memory region in the RAM 110. Then, the CPU 106 subtracts the total BET amount, which is the sum total of the BET amounts, from the credit amount C thus read out, and stores the value thus subtracted in a predetermined memory region in the RAM 110. Subsequently, the flow proceeds to Step S44 according to the instruction from the CPU 106.

In the following Step S44, the CPU 106 determines whether or not the start switch 25 is in the ON state, i.e., the CPU 106 stands by until the player operates the start switch 25. Upon the player operating the start switch 25, and accordingly, upon receipt of an operation signal via the start switch 25 (in a case of "YES" in the determination processing denoted by Step S44), the CPU 106 determines that the start switch 25 has been operated, and accordingly, the CPU 106 switches the processing to Step S45.

On the other hand, in a case that the flow has proceeded to Step S53, the CPU 106 determines whether or not the credit amount C is equal to or greater than the total bet amount bet on the previous game. In other words, the CPU 106 determines whether or not the player can start the game by pushing the spin repeat bet switch 24. Specifically, in a case that the spin repeat bet switch 24 has been pushed, and accordingly, in a case that the operation signal has been input from the aforementioned switch 24, the CPU 106 reads out the credit amount C and the BET amount bet on each of the active pay lines L1 to L9 in the previous game stored in the predetermined memory areas of the aforementioned RAM 110. Then, the CPU 106 determines whether or not the aforementioned credit amount C is equal to or greater than the total bet amount bet in the previous game based upon the relation between the credit amount C and the BET amounts thus read out. The CPU 106 performs processing based upon the determination results. In a case that determination has been made that the aforementioned credit amount C is less than the total bet amount bet on the previous game (in a case of "NO" in the processing in Step S53), the CPU 106 cannot start the game, and accordingly, the CPU 106 ends this routine without performing any processing. On the other hand, in a case that determination has been made that the aforementioned credit amount C is equal to or greater than the total bet amount bet in the previous game (in a case of "YES" in the processing in Step S53), the CPU 106 subtracts the total bet amount bet in the previous game from the aforementioned credit amount C, and stores the subtracted value in a predetermined area of the RAM 110. Subsequently, the flow proceeds to Step S45 according to the instruction from the CPU 106.

In the following Step S45, the CPU 106 performs combination determination processing. Specific description will be made below regarding the combination determination processing.

In the aforementioned combination determination processing, first, the CPU 106 determines the combinations of the symbols when they are stationary along the aforementioned active pay lines. Specifically, the CPU 106 issues a command to the random number generator 112, which is an instruction to generate a random number. Then, the CPU 106 extracts a random number in a predetermined range ("0" to "65535" in the present embodiment) generated by the random number generator 112. Furthermore, the CPU 106 stores the random number thus extracted in a predetermined memory region of the RAM 110. Note that description is being made in the present embodiment regarding an arrangement in which the random number is generated by the random number generator 112, which is provided in the form of a separate component from the aforementioned CPU 106. Also, an arrangement may be made in which the random number is generated by computation processing by the CPU 106 without involving the random number generator 112. The CPU 106 reads out a random number table and a particular winning combination table (random number table for a basic game (see FIG. 11)), each of which is stored in the ROM 108. Then, the CPU 106 stores the random number table and the particular winning combination table thus read out in a predetermined memory area of the RAM 110. Note that the CPU 106 controls display of the video reels when they are stationary for each reel based upon the aforementioned random number table. Furthermore, the CPU 106 reads out the random number table and the particular winning combination table stored in the predetermined area of the aforementioned RAM 110. Then, the CPU 106 determines the combination of the symbols when they are stationary with respect to the aforementioned active pay lines with reference to the aforementioned random number table using the random number stored in the predetermined memory region of the aforementioned RAM 110 as a parameter. Upon determination of particular winning combinations, the CPU 106 stores the particular winning combination data thus determined in a predetermined memory area of the RAM 110. Then, the CPU 106 reads out the random number and the particular winning combination data stored in the predetermined memory area of the RAM 110, and determines the combination of the symbols to be displayed when they are stationary based upon the random number and the particular winning combination data thus read out. In this stage, a symbol disposition table stored in the ROM 108 is read out by the CPU 106. Furthermore, the symbol disposition table thus read out is stored in a predetermined memory area of the RAM 110, and is used as reference data. The CPU 106 stores the data for the stationary symbols thus determined in a predetermined memory area of the RAM 110. Alternatively, an arrangement may be made in which the symbols when they are stationary are determined for each reel using the aforementioned random number table.

Upon determination of the combination of the symbols when they are stationary with respect to the aforementioned active pay lines, the CPU 106 determines whether or not the combination of the symbols when they are stationary with respect to the active pay lines matches any one of the particular winning combinations. In a case that the combination of the symbols when they are stationary with respect to the active pay lines matches any one of the particular winning combinations, the CPU 106 activates a flag, which indicates that the player has won the prize that corresponds to the kind of particular winning combination, in order to provide the prize that accords with the particular winning combination of symbols with respect to the active pay lines thus determined as described above. The activated flag, which indicates that the player has won a prize, is stored in a predetermined area of the RAM 110 according to the instruction from the CPU 106. On the other hand, in a case that the combination of the symbols when they are stationary with respect to the active pay lines matches any one of the other combinations, i.e., the losing combinations, the CPU 106 does not activate the flag which indicates that the player has won a prize. Subsequently, the flow proceeds to Step S46 according to the instruction from the CPU 106.

In the following Step S46, the CPU 106 displays an image of the five video reels 3A through 3E starting to rotate. Specifically, the CPU 106 displays an image of the video reels 3A through E3 starting to rotate in a predetermined order or at the same time according to the symbol disposition table stored in the aforementioned RAM 110.

Upon beginning to display a video image of the video reels 3A through 3E starting to rotate, the CPU 106 waits for a predetermined period of time to elapse (Step S47). After the predetermined period of time has elapsed (in a case of "YES" in the determination processing in Step S47), the CPU 106 instructs the video reels 3A through 3E to automatically stop rotating (Step S48). Specifically, the CPU 106 displays an image of the video reels 3A through 3E stopping to rotate in a predetermined order or at the same time such that the symbols when they are stationary, which correspond to a particular winning combination as determined in the aforementioned Step S45, is displayed in a display region that can be observed by the player. Subsequently, the flow proceeds to Step S49 according to the instruction from the CPU 106.

In the following Step S49, the CPU 106 determines whether or not a predetermined symbol combination has been formed based upon the results of the combination determination processing performed in Step S45. Specifically, the CPU 106 makes this determination based upon the state of the flag that indicates whether or not the player has won a prize with respect to the active pay lines stored in the predetermined memory area of the aforementioned RAM 110. In a case that the flag, which indicates that the player has won a prize, has not been activated, i.e., in a case that the symbol combination matches any one of the "other" combinations, which are combinations other than the particular winning combinations (in a case of "NO" in the determination processing in Step S49), the CPU 106 determines that the particular winning combination has not been formed, and ends this routine. On the other hand, in a case that the flag, which indicates that the player has won a prize, has been activated, i.e., in a case that the symbol combination matches any one of the combinations other than the "other" combinations (in a case of "YES" in the determination processing in Step S49), the flow proceeds to Step 50 according to the instruction from the CPU 106.

In the following Step S50, the CPU 106 determines whether or not the symbol combination thus formed in the combination determination processing performed in Step S45 is "BONUS". Specifically, in a case that the particular winning combination is "BONUS" (in a case of "YES" in the determination processing in Step S50), the flow proceeds to Step S51 according to the instruction from the CPU 106. On the other hand, in a case that the particular winning combination is not "BONUS" (in a case of "NO" in the determination processing in Step S50), the flow proceeds to Step S52 according to the instruction from the CPU 106.

In a case that the flow proceeds to Step S51, the CPU 106 performs free game processing 2. Subsequently, the CPU 106 ends this routine.

On the other hand, in a case that the flow proceeds to Step S52, the CPU 106 pays out a predetermined amount of coins corresponding to the particular winning combination. Specifically, the CPU 106 calculates the amount of coins to be paid out for the aforementioned particular winning combination, with reference to the payout table. The CPU 106 reads out the credit amount stored in the aforementioned predetermined memory area of the RAM 110. Then, the CPU 106 calculates the sum total of the payout amount thus calculated and the credit amount thus read out, and stores the value thus calculated in a predetermined memory area of the RAM 110. The CPU 106 displays the aforementioned value thus stored on the credit amount display unit 49. Subsequently, the CPU 106 ends this routine.

Figure 23A:
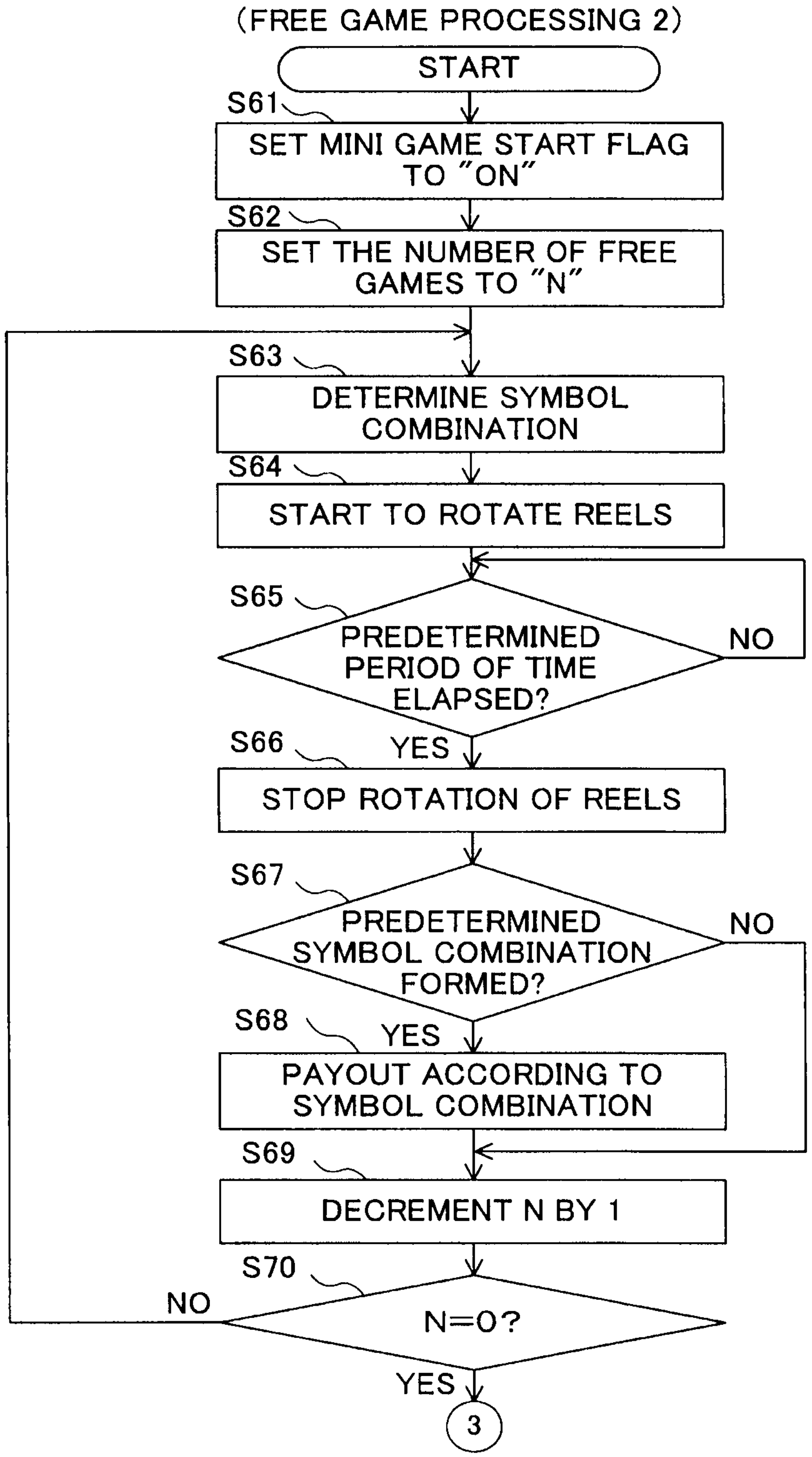
FIG. 23A and FIG. 23B show a flowchart for free game processing 2 executed by the gaming machine according to the embodiment of the present invention.
Figure 23B:
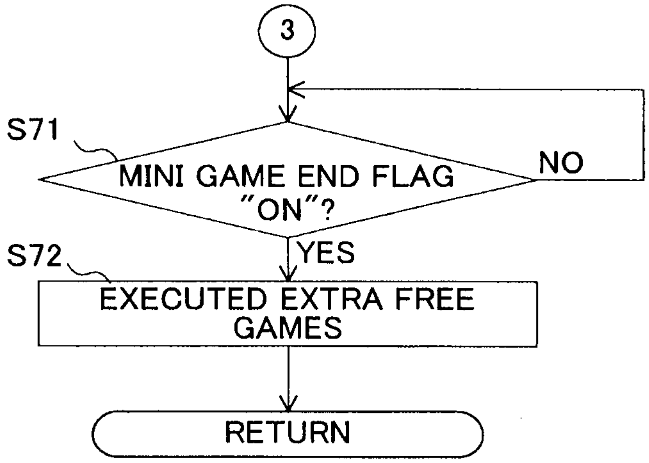

Description will be made regarding the free game processing 2 with reference to FIG. 23A and FIG. 23B.

In Step S61, the CPU 106 sets the mini game start flag to "ON", following which the flow proceeds to Step S62. Specifically, the CPU 106 writes the data that indicates that the mini game start flag is in the ON state to the mini game start flag storage region of the RAM 110.

In Step S62, the CPU 106 sets the number of free games N, following which the flow proceeds to Step S63 according to the instruction from the CPU 106. Here, the number of free games is determined in the step in which the game mode is switched from the basic game mode to the free game mode.

In Step S63, the CPU 106 performs symbol combination determination processing, following which the flow proceeds to Step S64. Specifically, the symbol combination determination processing performed in Step S63 is approximately the same as that in Step S45 described above with reference to FIG. 22. The point of difference is that the reference table used by the CPU 106 in Step S62 is a free game random number table (see FIG. 25).

Returning to FIG. 23, in Step S64, the CPU 106 displays an image of the video reels 3A through 3E starting to rotate, following which the flow proceeds to Step S65. Specifically, this processing is the same as that in Step S46 described above with reference to FIG. 22.

Returning to FIG. 23, in Step S65, the CPU 106 determines whether or not a predetermined period of time has elapsed. In a case that the predetermined period of time has elapsed, the flow proceeds to Step S66. On the other hand, in a case that the predetermined period of time has not elapsed, the flow proceeds to Step S65. Specifically, this processing is the same as that in Step S47 described above with reference to FIG. 22.

Returning to FIG. 23, in Step S66, the CPU 106 displays an image of the video reels 3A through 3E stopping to rotate, following which the flow proceeds to Step S67. Specifically, this processing is the same as that in Step S48 described above with reference to FIG. 22.

Returning to FIG. 23, in Step S67, the CPU 106 determines whether or not a predetermined symbol combination has been formed. In a case that the predetermined symbol combination has been formed, the flow proceeds to Step S68. On the other hand, in a case that the predetermined symbol combination has not been formed, the flow proceeds to Step S69. Specifically, this processing is the same as that in Step S49 described above with reference to FIG. 22.

Returning to FIG. 23, in Step S68, the CPU 106 performs payout processing according to the symbol combination, following which the flow proceeds to Step S69. Specifically, the CPU 106 calculates the amount of coins to be paid out according to the symbol combination that provides a prize, with reference to a free game payout table (not shown). The CPU 106 reads out the credit amount stored in a predetermined memory region in the RAM 110. Then, the CPU 106 adds the aforementioned amount thus calculated to the credit amount thus read out, and stores the value thus calculated in a predetermined memory region in the RAM 110. The CPU 106 displays the value thus stored on the credit amount display unit 49.

In Step S69, the CPU 106 decrements by 1 the number of free games N, following which the flow proceeds to Step S70.

In Step S70, the CPU 106 determines whether or not N is equal to 0. In a case that N is not equal to 0, the flow proceeds to Step S63 according to the instruction from the CPU 106. On the other hand, in a case that N is equal to 0, the flow proceeds to Step S71 according to the instruction from the CPU 106.

In Step S71, the CPU 106 determines whether or not the mini game end flag is in the ON state. Specifically, the CPU 106 determines whether or not the data that indicates that the mini game end flag is in the ON state has been written to the mini game end flag storage region in the RAM 110. In a case that the CPU 106 has determined that the mini game end flag is in the ON state, the flow proceeds to Step S72 according to the instruction from the CPU 106. On the other hand, in a case that determination has not been made that the mini game end flag is in the ON state, the flow proceeds to Step S71 according to the instruction from the CPU 106.

In Step S72, the CPU 106 executes extra free games. Specifically, the CPU 106 executes the extra free games, the number of which has been determined in Step S88 described later with reference to FIG. 24.

Figure 24:
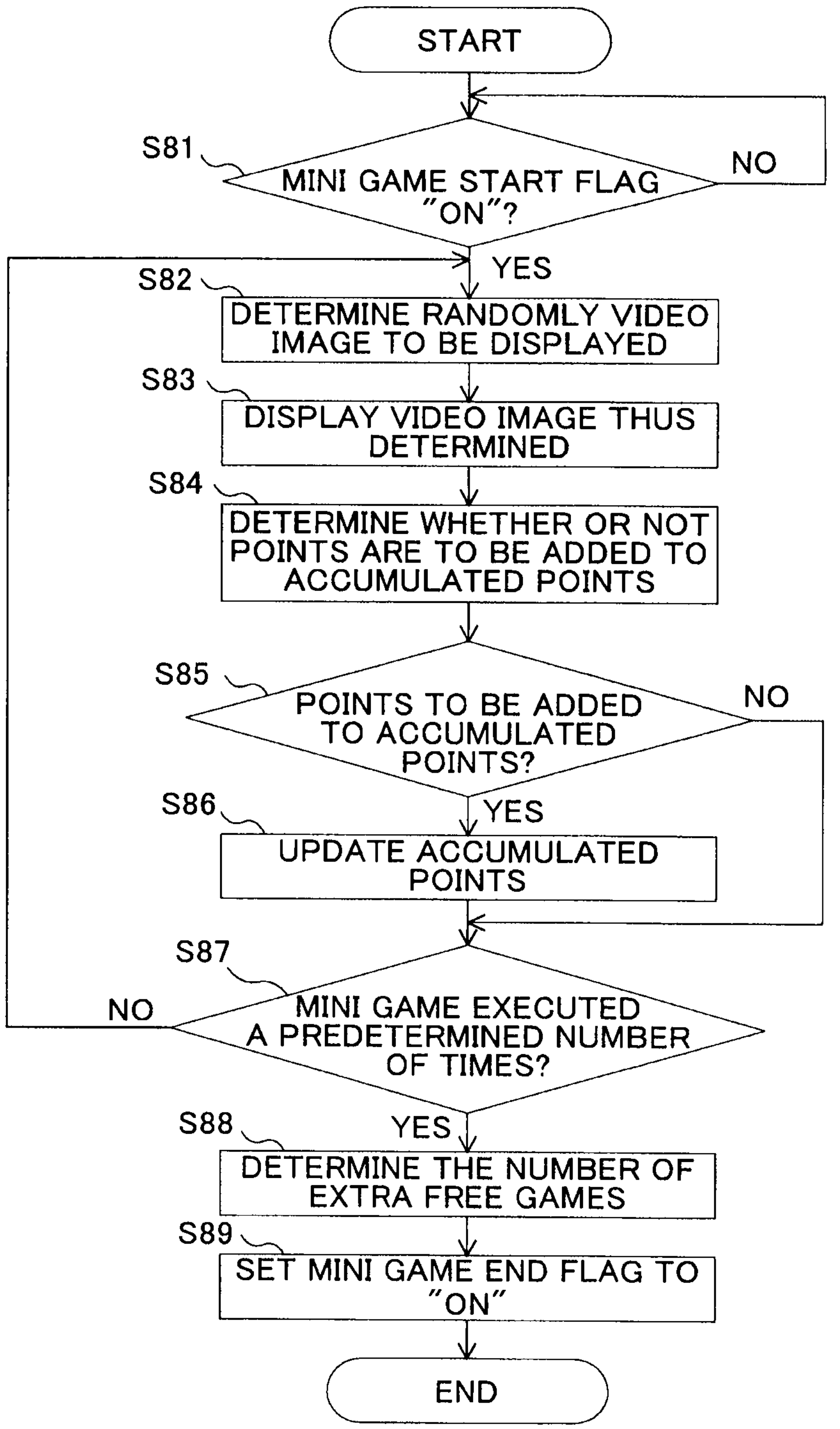
FIG. 24 is a flowchart for mini game processing 2 executed by the gaming machine according to the embodiment of the present invention.

Description will be made regarding mini game processing 2 with reference to FIG. 24.

In Step S81, the CPU 106 determines whether or not the mini game start flag is in the ON state. Specifically, the CPU 106 determines whether or not the data that indicates that the mini game start flag is in the ON state has been written to a mini game start flag region in the RAM 110. In a case that the CPU 106 has determined that the mini game start flag is in the ON state, the flow proceeds to Step S82. On the other hand, in a case that the CPU 106 has not determined that the mini game start flag is in the ON state, the flow proceeds to Step S81.

In Step S82, the CPU 106 randomly determines the image to be displayed on the liquid crystal display 30, following which the flow proceeds to Step S83. Specifically, the CPU 106 determines the video image to be displayed, from among a video image of a first enemy character, a video image of a second enemy character, and a video image of a third enemy character, with reference to the video image type determination random number table described above with reference to FIG. 12.

In Step S83, the CPU 106 displays on the liquid crystal display 30 the image that has been determined in Step S82 to be displayed, following which the flow proceeds to Step S84. Specifically, the CPU 106 extracts the image thus determined from the ROM 108, and displays the image thus extracted on the liquid crystal display 30 via the display/input controller 140.

In Step S84, the CPU 106 determines whether or not the points are to be added to the accumulated points, whereupon the flow proceeds to Step S85. Here, the term "accumulated points" as used here represents the points which are to be updated according to the results of executing the mini game, and which are stored in a predetermined region of the RAM 110. Specifically, in Step S85, the CPU 106 determines whether or not the points are to be added to the accumulated points with reference to the points addition determination random number tables 1 through 3. Here, the points to be added are defined in the points table described above with reference to FIG. 13.

In Step S85, the CPU 106 checks whether or not determination has been made that the points are to be added to the accumulated points. In a case that determination has been made that the addition is to be made, the flow proceeds to Step S86. On the other hand, in a case that determination has not been made that the addition is to be made, the flow proceeds to Step S87.

In Step S86, the CPU 106 updates the accumulated points, following which the flow proceeds to Step S87. Specifically, the CPU 106 reads out the points to be added from the points table described above with reference to FIG. 13, and adds the points thus read out to the accumulated points stored in the predetermined storage region of the RAM 110, thereby updating the accumulated points.

In Step S87, the CPU 106 determines whether or not the mini game has been executed a predetermined number of times. In a case that determination has been made that the mini game has been executed the predetermined number of times, the flow proceeds to Step S88. On the other hand, in a case that determination has not been made that the mini game has been executed the predetermined number of times, the flow proceeds to Step S82. Specifically, the CPU 106 reads out the number of instances of execution of the mini game stored in the predetermined storage region of the RAM 110, and determines whether or not the number of instances of execution of the mini game has reached the predetermined number.

In Step S88, the CPU 106 determines the number of extra free games, following which the flow proceeds to Step S89. Specifically, the CPU 106 determines the number of extra free games according to the accumulated points with reference to an extra free games table described later with reference to FIG. 26.

In Step S89, the CPU 106 sets the mini game end flag to the ON state. Specifically, the CPU 106 writes the data that indicates that the mini game end flag is in the ON state to the mini game end flag storage region in the RAM 110. Subsequently, the CPU 106 ends this routine.

Description will be made regarding a free game random number table with reference to FIG. 25. In the free game random number table, each particular winning combination that provides a prize is registered in association with a corresponding random number range and its determination probability. With such an arrangement, a random number is extracted in a range of "0" to "65535". Accordingly, in the combination determination processing (Step S63 in FIG. 23), in a case that a random number has been extracted in a range of "0" to "999", determination is made in the gaming machine 13 that a particular winning combination that provides a "BONUS" prize is to be provided as the final result of the basic game. In other words, the probability is "1000/65536" that the combination of symbols when they are stationary will match the particular winning combination for providing the "BONUS" prize.

Description will be made regarding a video image type determination random number table with reference to FIG. 12. The video image type determination random number table is a reference table used by the CPU 106 to determine one video image from among the video images of the enemy character 1 through the enemy character 3. Let us consider a case in which the random number generator 112 has generated the random number "13000" in the processing in which the video image to be displayed is randomly determined (Step S82 in FIG. 24), for example. In this case, the random number thus generated belongs to the random number range "0 to 29999", and accordingly, determination is made that the video image to be displayed is the "enemy character 1" video image.

Description will be made regarding the points table with reference to FIG. 13. The points table is a reference table used by the CPU 106 to perform addition processing in which the points associated with the video image thus displayed are added to the accumulated points. In a case that the points in the accumulated points update processing (Step S24 in FIG. 86) correspond to the first enemy character, the CPU 106 adds "10" points to the accumulated points.

Description will be made regarding a points addition determination random number table 1 with reference to FIG. 14. The points addition determination random number table 1 is a reference table used by the CPU 106 in a case that the hero character 80 has the experience value of "0 to 50" in the mini game. The term "experience value" as used here represents the sum total of the accumulated number of instances of execution of the mini game and the accumulated points. For example, let us consider a case in which the random number generator 112 has generated the random number "3000" in the determination processing in which determination is made whether or not the points are to be added to the accumulated points (Step S84 in FIG. 24). In this case, the random number 3000 thus generated belongs to the random number range of "0 to 9999", resulting in the determination that "the hero character 80 defeats the enemy character 1". Accordingly, determination is made that the "10" points associated with the first enemy character 81 are added to the accumulated points.

Description will be made regarding a points addition determination random number table 2 with reference to FIG. 15. The points addition determination random number table 2 is a reference table used by the CPU 106 in a case that the hero character 80 has the experience value of "51 to 100" in the mini game. In the points addition determination random number table 2, the probabilities that the hero character 80 will defeat the enemy character 1 through the enemy character 3 are higher than those in the points addition determination table 1 shown in FIG. 14.

Description will be made regarding a points addition determination random number table 3 with reference to FIG. 16. The points addition determination random number table 3 is a reference table used by the CPU 106 in a case that the hero character 80 has the experience value of "101 or more" in the mini game. In the points addition determination random number table 3, the probabilities that the hero character 80 will defeat the enemy character 1 through the enemy character 3 are higher than those in the points addition determination table 2 shown in FIG. 15.

As described with reference to FIGS. 14 through 16, the higher the experience value is, the higher is the probability that the hero character 80 will defeat the first enemy character through the third enemy character. Accordingly, the probability that the accumulated points will be updated such that the points will be added to the accumulated points is increased according to the accumulated number of instances of execution of the mini game or the accumulated points, i.e., according to the value that determines the experience value.

With the present embodiment, the probability that the accumulated points will be updated is determined according to the experience value. The present invention is not restricted to such an arrangement. Also, the probability that the accumulated points will be updated may be randomly determined, or may be determined according to the accumulated points. Also, the probability that the accumulated points will be updated may be determined according to the accumulated number of instances of execution of the mini game.

Description will be made regarding the extra free games table with reference to FIG. 26. The extra free games table is a reference table used by the CPU 106 to determine the number of extra free games according to the accumulated points. For example, in a case that the accumulated points are "70" in the extra free games determination processing (Step S88 in FIG. 24), the number of free games is determined to be "50".

With the present embodiment, the number of extra free games increases according to the increase in the accumulated points obtained as a result of repeated instances of execution of the mini game. Such an arrangement increases the player's level of interest in the game. This offers a game with further enhanced entertainment value.

FIGS. 18 through 20, and FIG. 27 are diagrams which show video images that provide visual effects for the mini game. In FIGS. 18 through 20, and FIG. 27, a video image for the free game is displayed in the upper display region of the liquid crystal display 30. On the other hand, the lower display region thereof displays a video image for the mini game.

Now, description will be made regarding the video image for the mini game shown in FIG. 18. FIG. 18 shows a scene in which the hero character 80 fights the first enemy character 81. Furthermore, FIG. 18 shows a state in which the number of instances of execution of the mini game is 10, and the accumulated points are 50. With such an arrangement, the video image for the first enemy character 81 is selected in the determination processing in which the image to be displayed is randomly determined (Step S82 in FIG. 24), thereby displaying the video image for the mini game.

Description will be made regarding the video image for the mini game shown in FIG. 19. FIG. 19 shows a scene in which the hero character 80 has defeated the first enemy character 81. Furthermore, FIG. 19 shows a state in which the number of instances of execution of the mini game has changed to 11 as a result of being incremented by 1, and the accumulated points have changed to 60 by 10 points having been added to the accumulated points as a result of the victory over the first enemy character 81. Furthermore, a headline "WIN!! 10 POINTS GET!!" is displayed, which indicates that 10 points have been added to the accumulated points as a result of the victory over the first enemy. With such an arrangement, such a video image for the mini game is displayed in a case that determination has been made that the hero character 80 has won a victory over the first enemy character 81 in the determination processing in which determination is made whether or not the points are to be added to the accumulated points (Step S84 in FIG. 24).

Description will be made regarding a video image for the mini game shown in FIG. 20. FIG. 20 shows a scene in which the hero character 80 is defeated by the first enemy character 81. Furthermore, FIG. 20 shows a state in which the number of instances of execution of the mini game has changed to 11 as a result of being incremented by 1, and the accumulated points have not been updated, and accordingly, the accumulated points remain 50. With such an arrangement, such a video image for the mini game is displayed in a case that determination has not been made that the hero character 80 has won a victory over the first enemy character 81 in the determination processing in which determination is made whether or not the points are to be added to the accumulated points (Step S84 in FIG. 24).

Figure 27:
FIG. 27 shows an example of a display screen displayed in the mini game executed by the gaming machine according to the embodiment of the present invention.

Description will be made regarding a video image for the mini game shown in FIG. 27. FIG. 27 shows a state in which, after the mini game has ended, the number of instances of execution of the mini game has reached 15, and the accumulated points have reached 120. Furthermore, FIG. 21 shows a scene in which the hero character 80 celebrates the results. Furthermore, a headline "You win 70 extra free games!!" is displayed, which indicates that determination has been made that the player has won 70 extra free games. With such an arrangement, such a video image for the mini game is displayed in a case that determination has been made that the player has won 70 extra free games in the extra free games determination processing (Step S88 in FIG. 24).

While the gaming machine according to the present invention has been described above by way of embodiments, it should be clearly understood that the embodiments are merely a listing of specific examples, and that the embodiments in no way restrict the present invention, and that the specific configurations such as the means may be modified and altered as suitable. Moreover, it should be understood that the advantages described in association with the embodiments are merely a listing of most preferred advantages according to the present invention, and that the advantages of the present invention are by no means restricted to those described in association with the embodiments of the present invention.

For example, description has been made in the present embodiment regarding an arrangement in which a video image for the basic game (free game) is displayed in the upper display region of the liquid crystal display 30, and the lower display region displays a video image for the mini game. However, the present invention is not restricted to such an arrangement. Also, an arrangement may be made in which the upper display region displays a video image for the mini game, and the lower display region displays a video image for the basic game (free game). Also, a video image for the mini game may be displayed on the liquid crystal display 40.

Also, description has been made in the present embodiment regarding an arrangement in which the mini game progresses without involving the player's operation. However, the present invention is not restricted to such an arrangement. Also, an arrangement may be made in which the mini game progresses according to the player's operation.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

The invention claimed is:

1. A gaming machine comprising:

a display which displays a video image and symbols that are different from the video image;

a computer readable storage device that stores accumulated points that are updated according to results of executing a mini game, and stores a plurality of video images with respect to the mini game;

an input device that outputs a signal that starts a basic game; and a controller that (a) upon receipt of the signal from said input device, starts the basic game, wherein the basic game is operated by rearranging the symbols and, when a predetermined combination of the symbols occurs, a start of a free game is performed according to the combination of the symbols, (b) executes the mini game in accordance with the start of the basic game, (c) randomly determines the video image with respect to the mini game to be displayed on the display each time the mini game is executed, (d) extracts from the storage device the video image that was randomly determined and displays the video image on the display, (e) determines through a random selection process whether points associated with the displayed video image are to be added to the accumulated points, (f) in a case that determination has been made that the points are to be added to the accumulated points, adds the points to the accumulated points so as to update the accumulated points, and (g) after the mini game has been executed a predetermined number of times, determines a number of free games according to the updated accumulated points, wherein the free games are operated by rearranging the symbols and, when a predetermined combination of the symbols occurs, a payout are performed according to the combination of the symbols, wherein the random process of step (e) is executed with a reference number table which includes a plurality of number ranges to be used in the random selection process and is changed in accordance with an experience value that is sum total of an accumulated number of execution of the mini game and the accumulated points.

2. The gaming machine of claim 1, wherein the reference table is changed from a first table to a second table that provides an increased probability for adding points to the accumulated points than the first table when the experience value is over a first predetermined value.

3. The gaming machine of claim 2, wherein the second table provides a probability for adding points to the accumulated points, which is double of a probability for adding points to the accumulated points provided by the first table.

4. The gaming machine of claim 2, wherein the reference table is changed from the second table to a third table that provides an increased probability for adding points to the accumulated points than the second table when the experience value is over a second predetermined value.

5. The gaming machine of claim 4, wherein the third table provides a probability for adding points to the accumulated points, which is triple of a probability for adding points to the accumulated points provided by the first table.

6. A gaming machine comprising:

a display that displays a video image and symbols that are different from the video image;

a computer readable storage device that stores accumulated points that are updated according to results of executing a mini game, and stores a plurality of video images with respect to the mini game;

an input device that outputs a signal that starts a basic game; and a controller that (a) upon receipt of the signal from said input device, starts the basic game, wherein the basic game is operated by rearranging the symbols and, when a predetermined combination of the symbols occurs, a start of a free game is performed according to the combination of the symbols, (b) the mini game is executed in accordance with the start of the basic game, (c) randomly determines the video image with respect to the mini game to be displayed on the display each time the mini game is executed, (d) extracts from the storage device the video image that was randomly determined and displays the video image on the display, (e) determines through a random selection process whether the points associated with the displayed video image are to be added to the accumulated points, (f) in a case that determination has been made that the points are to be added to the accumulated points, adds the points to the accumulated points so as to update the accumulated points, and (g) after the mini game has been executed a predetermined number of times, determines a number of free games according to the updated accumulated points, wherein the free games are operated by rearranging the symbols and, when a predetermined combination of the symbols occurs, a payout are performed according to the combination of the symbols, wherein the determination of step (e) is executed with a reference number table which includes a plurality of number ranges to be used in the random selection process and is changed in accordance with the accumulated points.

7. The gaming machine of claim 2, wherein the reference table is changed from a first table to a second table that provides an increased probability for adding points to the accumulated points than the first table when the accumulated points is over a first predetermined value.

8. The gaming machine of claim 7, wherein the second table provides a probability for adding points to the accumulated points, which is double of a probability for adding points to the accumulated points provided by the first table.

9. The gaming machine of claim 7, wherein the reference table is changed from the second table to a third table that provides an increased probability for adding points to the accumulated points than the second table when the accumulated points is over a second predetermined value.

10. The gaming machine of claim 9, wherein the third table provides a probability for adding points to the accumulated points, which is triple of a probability for adding points to the accumulated points provided by the first table.

11. A gaming machine comprising:

a display that displays a video image and symbols that are different from the video image;

a computer readable storage device that stores accumulated points that are updated according to results of executing a mini game, and stores a plurality of video images with respect to the mini game;

an input device that outputs a signal that starts a basic game; and a controller that (a) upon receipt of the signal from said input device, starts the basic game, wherein the basic game is operated by rearranging the symbols and, when a predetermined combination of the symbols occurs, a start of a free game is performed according to the combination of the symbols, (b) the mini game is executed in accordance with the start of the basic game, (c) randomly determines the video image with respect to the mini game to be displayed on the display each time the mini game is executed, (d) extracts from the storage device the video image that was randomly determined and displays the video image on the display, (e) determines through a random selection process whether the points associated with the displayed video image are to be added to the accumulated points, (f) in a case that determination has been made that the points are to be added to the accumulated points, adds the points to the accumulated points, so as to update the accumulated points, and (g) after the mini game has been executed a predetermined number of times, determines a number of free games according to the updated accumulated points, wherein the free games are operated by rearranging the symbols and, when a predetermined combination of the symbols occurs, a payout are performed according to the combination of the symbols, wherein the determination of step (e) is executed with a reference number table which includes a plurality of number ranges to be used in the random selection process and is changed in accordance with the accumulated number of execution of the mini game.

12. The gaming machine of claim 3, wherein the reference table is changed from a first table to a second table that provides an increased probability for adding points to the accumulated points than the first table when the accumulated number of execution of the mini game is over a first predetermined value.

13. The gaming machine of claim 12, wherein the second table provides a probability for adding points to the accumulated points, which is double of a probability for adding points to the accumulated points provided by the first table.

14. The gaming machine of claim 12, wherein the reference table is changed from the second table to a third table that provides an increased probability for adding points to the accumulated points than the second table when the accumulated number of execution of the mini game is over a second predetermined value.

15. The gaming machine of claim 14, wherein the third table provides a probability for adding points to the accumulated points, which is triple of a probability for adding points to the accumulated points provided by the first table.

* * * * *